US007882594B2

(12) United States Patent
Ramsauer

(10) Patent No.: US 7,882,594 B2
(45) Date of Patent: Feb. 8, 2011

(54) HANDLE FOR MOUNTING IN AN OPENING

(76) Inventor: Dieter Ramsauer, Max-Klein-Str. 10, D-58332 Schwelm (DE)

( * ) Notice: Subject to any disclaimer, the term of this patent is extended or adjusted under 35 U.S.C. 154(b) by 757 days.

(21) Appl. No.: 11/663,292

(22) PCT Filed: Sep. 15, 2005

(86) PCT No.: PCT/EP2005/009929

§ 371 (c)(1),
(2), (4) Date: Oct. 11, 2007

(87) PCT Pub. No.: WO2006/032403

PCT Pub. Date: Mar. 30, 2006

(65) Prior Publication Data

US 2008/0127458 A1 Jun. 5, 2008

(30) Foreign Application Priority Data

Sep. 20, 2004 (DE) ................... 20 2004 014 766 U

(51) Int. Cl.
*H01M 2/10* (2006.01)
*A45C 13/26* (2006.01)

(52) U.S. Cl. ............................ 16/412; 16/422; 16/444; 16/DIG. 41

(58) Field of Classification Search ........... 24/289–295, 24/297; 220/755, 753, 759; 403/251, 252, 403/297, 397, 408.1; 411/41, 45–48, 508–510; 296/214, 216, 218, 210, 224; 16/412, 413, 16/415, 422, 444, DIG. 40–41
See application file for complete search history.

(56) References Cited

U.S. PATENT DOCUMENTS 1,689,044 A 10/1928 Meyer
2,501,940 A * 3/1950 Hibbard ........................ 16/425
3,310,929 A * 3/1967 Garvey ........................ 24/295
3,842,709 A * 10/1974 Fuqua ........................ 411/350
3,932,010 A * 1/1976 Kenworthy .................. 16/416
3,939,752 A * 2/1976 Koscik ....................... 411/548
3,969,009 A * 7/1976 Radek ..................... 312/348.6

(Continued)

FOREIGN PATENT DOCUMENTS

EP 0 258 491 3/1988

(Continued)

*Primary Examiner*—Chuck Y. Mah
(74) *Attorney, Agent, or Firm*—Frommer Lawrence & Haug LLP

(57) ABSTRACT

A handle has at least one holding plate which can be mounted in an opening in a thin wall such as a sheet-metal cabinet door, a head part, such as a flange or turning handle, which covers the rim of the opening of the thin wall on its (outer) side, and a body part which proceeds from the head part and can be pushed through the opening in the thin wall, and a holding part which is carried by the body part, supported on the other (rear) side of the thin wall, and is separate from the body part. According to the invention, the holding part is formed by holding elements which project in a flexible manner from the body part in the direction of its outer surface and whose free end has an inclined surface for supporting the body part on the rim or edge of the opening without play.

15 Claims, 24 Drawing Sheets

U.S. PATENT DOCUMENTS 4,153,314 A * 5/1979 Prater ...................... 312/348.6
4,834,433 A 5/1989 Keller
5,158,329 A * 10/1992 Schlack ...................... 292/87
5,248,175 A 9/1993 Burns
5,251,467 A * 10/1993 Anderson .................... 70/370
5,435,159 A 7/1995 Ramsauer
5,560,575 A * 10/1996 Krysiak ................. 248/222.12
5,758,987 A * 6/1998 Frame et al. ................ 403/298
6,019,401 A 2/2000 Prevot et al.
6,039,366 A * 3/2000 Lewis ......................... 292/352
6,648,542 B2 * 11/2003 Smith et al. ................. 403/291
7,320,157 B2 * 1/2008 Lubera et al. ................. 24/295

FOREIGN PATENT DOCUMENTS

GB 1 508 858 4/1978
GB 1520021 A * 8/1978
WO 01/079629 10/2001

* cited by examiner

Fig.20A.
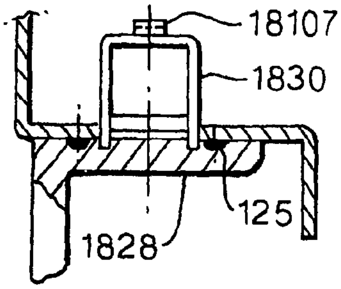
Fig.20B.
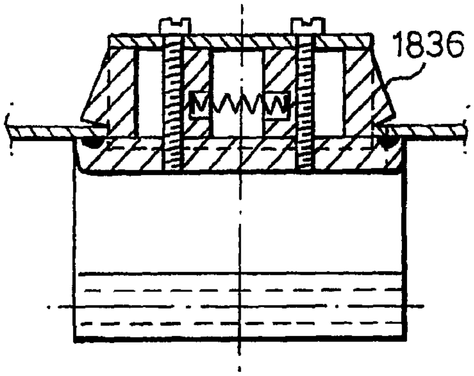
Fig.20C.
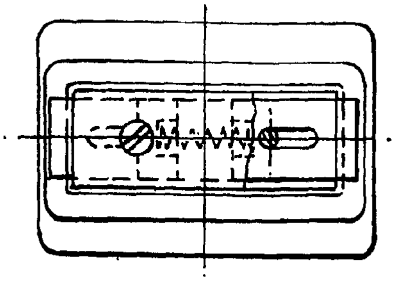
Fig.20D.
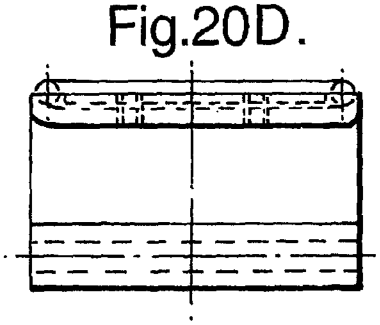
Fig.20E.
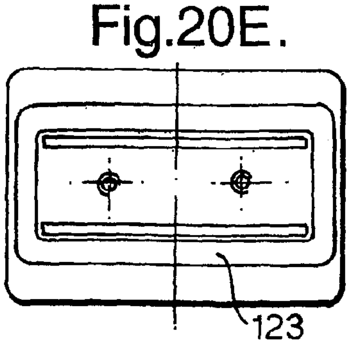
Fig.20F.
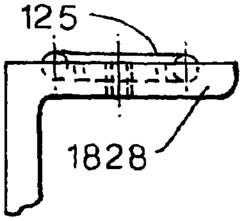
Fig.20G.
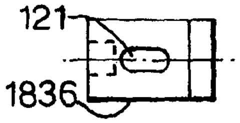
Fig.20H.
Fig.20I.
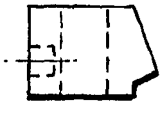
Fig.20J.
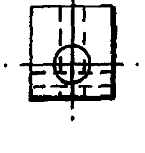
Fig.20K.
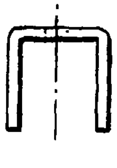
Fig.20L.
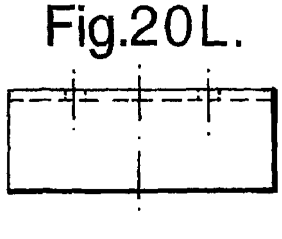

HANDLE FOR MOUNTING IN AN OPENING

CROSS-REFERENCE TO RELATED APPLICATIONS

This application claims priority of International Application No. PCT/EP2005/009929, filed Sep. 15, 2005 and German Application No. 20 2004 014 766.1, filed Sep. 20, 2004, the complete disclosures of which are hereby incorporated by reference.

BACKGROUND OF THE INVENTION a) Field of the Invention

The invention is directed to a handle which has at least one holding plate which can be mounted in an opening in a thin wall such as a sheet-metal cabinet door, a head part, such as a flange or turning handle, which covers the rim of the opening of the thin wall on its (outer) side, and a body part which proceeds from the head part and can be pushed through the opening in the thin wall, and a holding part which is carried by the body part, supported on the other (rear) side of the thin wall, and is separate from the body part.

b) Description of the Related Art

A handle of the type mentioned above is already known from a brochure entitled "Handbook 2000" by Southco. In the prior art, the holding part comprises a screw that is screwed into corresponding threaded bore holes of the body part from the rear and secures this body part in the opening of a sheet-metal switch cabinet. This type of mounting has the disadvantage that it is not immune to vibrations. Further, mounting is complicated; in particular, parts can be lost.

OBJECT AND SUMMARY OF THE INVENTION

It is the primary object of the invention to improve the known arrangement, particularly with respect to achieving immunity to vibrations and simplifying mounting. Further, loose parts which could lead to short-circuiting when falling into the switch cabinet are avoided as far as possible.

The object is met according to the invention in that the holding part is formed by holding elements which project in a flexible manner from the body part in the direction of the outer surface thereof and whose free end has an inclined surface for supporting the body part without play on the rim or edge of the opening in the thin wall.

A majority of the tasks set by the invention are already fulfilled by means of this step. In particular, fastening is safeguarded against vibrations, mounting is greatly simplified and, further, very thin sheet metal can also be securely held. Different thicknesses of sheet metal are held without play when they do not exceed determined ranges. Loose parts are usually not required. Very thin sheet metal can be strengthened by additional sheet metal parts. Further, sheet metal parts serving as panels can be fastened with the handle at the same time.

DESCRIPTION OF OTHER RELATED ART

A clip-like fastening of the kind mentioned above for the handle in the form shown herein was not previously known, nor are the described advantages. A snap-in fastening for quick mounting of a lock housing is known with reference to U.S. Pat. No. 5,435,159, wherein a lock housing of this kind is arranged, for example, in a round opening in a thin wall. The housing which is intended for a sash lock comprises a head part, namely, a flange, which must be arranged on an outer side of the thin wall and which overlaps the outer rim of the opening. A body part which projects through the opening in the mounted position proceeds from this head part and flexible tongue elements project from the body part in the direction of its outer surface which has an inclined surface at the free end for supporting the body part without play on the frame of the opening of the other, inner side of the thin wall. This has the disadvantage that the holding force of the holding elements or tongue elements that are integral with the body part is dependent upon their spring tension which in turn depends upon the plastic material that is used and therefore the magnitude of the holding force cannot be made as large as desired. However, very large forces must often be absorbed when using the handle, so that this type of snap-in fastening cannot readily be applied to a handle part.

EP 0258491 discloses a construction similar to that known from U.S. Pat. No. 5,435,159 by which a lock cylinder can be fastened in thin-walled doors, drawers or the like by means of a plastic housing which receives the lock cylinder and forms the holding tongues. Common variations of the structural component parts to be locked can be adapted to in a desired manner by means of inclined surfaces at the ends of the tongues. It is also stated in column 9 of this reference that the springing tongues can no longer deflect inward after the lock cylinder is mounted in the housing. This prior art has the disadvantage that a very particular design, namely, a round housing with a lock cylinder inserted therein, must be provided to make it possible to lock the tongues in this way after mounting. In this case also, it does not seem obvious to transfer this tongue fastening to a handle.

In the handle according to the invention, in which the body part and the holding part are two separate parts and are not injection molded in one piece from plastic as in the two references cited above, the load capacity is substantially greater because, if required, a less durable plastic material which can easily be injection molded can be combined with a stronger material such as metal so that the desired strength of the handle is achieved by a corresponding choice of material.

According to a further development of the invention, two holding elements which are arranged diametrical to one another are provided and are acted upon by pressure elements such as spring arrangements, particularly a coil spring common to the two holding elements or two coil springs or wedge arrangements such as conical screws. Since the spring arrangements can be provided with spring force that can be freely selected, per se, the locking force can be adapted to the respective task and does not depend upon the plastic material.

In the prior art, the locking force is highly dependent upon the material characteristics of the plastic that is used unless a pin is used; but this in turn complicates mounting in an undesirable manner because blind mounting in particular is impossible. However, this can be provided according to the invention.

According to a further development of the handle, the holding elements are levers which are arranged at a distance from the rear surface of the thin wall so as to be rotatable in a defined manner around an axis parallel to the plane of the thin wall. This embodiment form increases the holding force while retaining the same spring strength.

Alternatively, the holding elements are levers which are arranged at a distance from the rear surface of the thin wall so as to be rotatable in a defined manner around an axis perpendicular to this surface. Accordingly, four holding points can be achieved simultaneously with two levers so as to increase the holding force while the spring tension remains unchanged.

According to a further development of the invention, the holding elements are slides that are arranged so as to be displaceable in a cylinder which lies parallel to the plane of the thin wall and is rectangular in cross section and are held against the force of a pressure spring by a hook arrangement that locks between the slides themselves or in the cylinder. The advantage of this construction consists in the relatively small structural height on the rear side of the door leaf. A similar construction results when the holding elements are slides of rigid material such as metal which are arranged so as to be displaceable in a cylinder that is parallel to the plane of the thin wall and rectangular in cross section and are held against the force of a pressure spring by a pin arrangement that is arranged between them. This is a particularly durable handle arrangement.

The cylinder can have a partial dividing wall or undercut or opening edge at which the slide can be supported axially by a shoulder or hook. This shows the variability of the design according to the invention, which is an advantage.

It is possible to reduce the size of the construction according to a further development of the invention when the holding element has an opening which receives a spiral pressure spring by at least a portion of its diameter.

Projections can project into the opening in order to hold the spring element radially.

In particular, the holding elements can be formed by two flat metal pieces lying next to one another. Each of these flat metal pieces has an opening, and these two openings together form a space which receives a spiral pressure spring by at least a portion of its diameter. The design advantageously enables pre-mounting in which these three parts are held together by the spring in such a way that they can be manipulated separately from the rest of the handle. This also applies when the holding elements are formed by two metal pieces which lie next to one another and which form projections and recesses which are directed toward one another and which limit the axial sliding movement relative to one another. This has the additional advantage that the movement path is limited without undertaking further steps with respect to the cylinder.

In a further development of this design, the holding elements are formed by two plastic pieces or metal pieces which lie next to one another and which form projections and recesses which are directed toward one another and which can be engaged by a rotatable tool or key in such a way that the plastic pieces or metal pieces are displaced relative to one another against the spring force when the tool or key is turned. This makes it possible to draw back the two holding elements that are operative in this case without expending a large amount of finger force and therefore makes it possible to disengage the holding plate from the opening of the thin wall when required. This is also a favorable aspect with respect to security because it is only possible with a special tool that is not available to everyone. As was already mentioned, another advantage can be achieved in that the holding elements are formed by a metal piece or by two metal pieces lying next to one another which is/are held jointly by a spring in such a way that these three parts form a manageable unit that is stable in itself.

Instead of a pin arrangement or, in a further development of the pin arrangement, a fixing pin or fixing plug or fixing screw can also be provided for fixing the holding elements after the holding plate is mounted in the opening. The screw, as the case may be, must be tightened by hand in order to achieve protect against vibrations.

A design in which the head part has a recess in the area of the holding elements proves advantageous insofar as any bulging of the rims of the opening, when not excessive, is also innocuous. When the rims bulge only slightly, the contact surface is increased so that even larger forces can be absorbed.

The holding element can also be formed by a leaf spring that is bent in a suitable manner. According to a further development, the leaf spring can be inserted into a radially extending cavity formed by the body part. The cavity can form a slot or recess in which a projection and recess of the spring lock the latter so as to be fixed in a working position. On the other hand, the leaf spring can be held by a head screw that is screwed into a threaded bore hole formed by the body part. Alternatively, the leaf spring can also be spot-welded or glued to a surface formed by the body part.

Alternatively, the holding plate has an opening like the thin wall and the holding part and the body part have their own head part. The head part and body part can also be two parts that are screwed together or can also be parts that are glued together or parts that are permanently or detachably connected in some other way.

It can be advantageous to arrange a plurality of holding elements next to one another in axial direction of the handle. On the other hand, it is also possible for a second holding plate, which is connected to the first holding plate by means of a retaining brace, to have a construction analogous to that of the first holding plate.

In a particular construction, the handle can penetrate into or be swiveled into or be rotated into a housing carrying the holding elements. When the handle has an elongated shape, it is advantageous when it forms a holding plate at both ends and holding elements proceed from this holding plate. The holding elements can be pretensioned in a flexible manner in direction of the handle axis or, alternatively, perpendicular to the direction of the handle axis.

According to another embodiment form, a spring which is a flat structural component part having a U-profile viewed from the top has U-legs which initially extend parallel from the bar of the U with a first, small width and then, beginning in the area of the projections, extend with a second, greater width at an increasing distance from one another and are cut off at the end substantially at right angles to their extension such that when mounted they are supported on the rim or edge of the opening with a slight inclination relative to the plane of the thin wall.

The spring can have a thickness of 0.5 mm to 0.8 mm. Therefore, the spring can be mounted in an extremely small space.

Aside from the advantages already mentioned above, there is the additional advantage of embodiment forms which make it possible to adapt to given conditions even more precisely. For example, the body part can have oppositely located grooves which form the recess and which have a depth such that they are capable of receiving the U-legs of at least one spring at least during the mounting process.

But it is also particularly advantageous that the groove can have a width such that a bundle of a plurality of flat springs arranged next to one another can be accommodated.

Holding forces can be adapted as needed by means of this bundling by allocating a certain quantity of flat springs to the bundle or bundles.

The range of thickness of the sheet metal at which the fitting, e.g., handle, is to be mounted can also be adapted. To this end, flat springs are simply bundled for different clamping areas thereby multiplying the sheet-metal thickness tolerance or sheet-metal thickness range.

Another advantage consists in that the body part on which the flat spring can be inserted (from above) or slipped on (from the sides) can be produced in a simple manner. The body part which is provided for insertion opens either on both sides into a flange, which prevents lateral slippage on both sides, or on at least one, preferably outer, side in which slippage is likewise prevented on the inner side through suitable steps such as a limited dimensioning of the associated opening or gluing or welding at least the final spring element to the body part.

The outer cross section of the body part with the inserted spring and the outer cross section of the associated opening in the thin wall are preferably rectangular.

The body part can be an elongated rectangle and form a head with a finger grip or hand grip. Further, the body part can form an elongated or substantially equilateral rectangle, and the distance between the support surface of the flange-like head part and the support surface of the end of the spring can be enlarged in such a way that two thin walls can be connected together.

Further, it is possible that the body part forms an elongated or substantially equilateral rectangle and the associated head part is a supporting point for one end of a handle.

BRIEF DESCRIPTION OF THE DRAWINGS

The invention will be explained more fully in the following with reference to embodiment examples shown in the drawings.

FIGS. 17A, 17B and 17C show an embodiment form in which the body part is screwed on;

FIGS. 20A, 20B, 20C, 20D, 20E and 20F show different views of another handle with a fastening that is outfitted according to the invention;

FIGS. 20G, 20H, 20I, 20J show the associated holding element;

FIGS. 20K and 20L show the associated screwed on cylinder;

FIG. 40 shows a spring element that is suitable for sliding on;

DESCRIPTION OF THE PREFERRED EMBODIMENTS

Figure 1A:
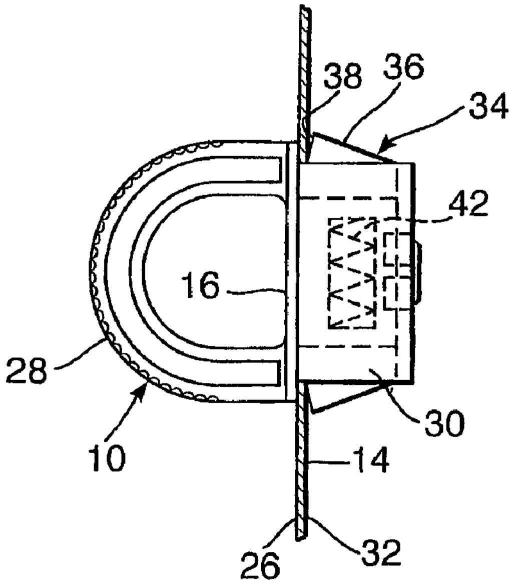
FIG. 1A shows a cross section through a thin wall with an opening in which a handle according to the invention is mounted.
Figure 1B:
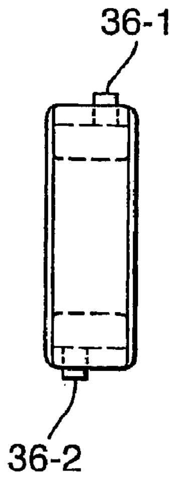
FIG. 1B shows a rear view of the handle shown in FIG. 1A.
Figure 1C:
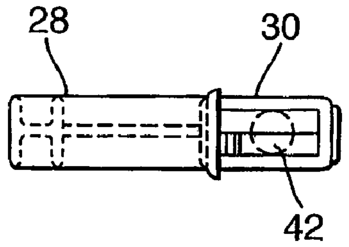
FIG. 1C is a side view of the handle shown in FIG. 1A.
Figure 1D:
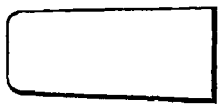
FIG. 1D shows a modified form.
Figure 4A:
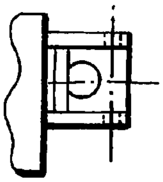
FIG. 4A is a top view of another embodiment form of the invention.
Figure 4B:
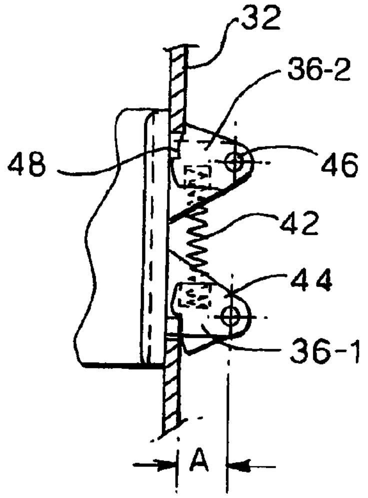
FIG. 4B is a side view of the same embodiment form.

FIGS. 1A, 1B, 1C and, in a somewhat modified form, FIG. 1D show different views of a handle 10 constructed according to the invention with at least one holding plate 16 which can be mounted in an opening 12, which is rectangular in the present case (see, e.g., FIG. 2), in a thin wall 14 such as a sheet-metal cabinet door 14. The holding plate 16 which can be mounted at the thin wall, such as a sheet-metal cabinet door 14, comprises a head part 28, such as a flange or, in this case, an eyelet of a handle, which overlaps the rim 24 of the opening 12 in the thin wall 14 on one (outer) side 26 thereof, and a body part 30 which proceeds from the head part 28 and which can be slid through the opening 12 in the thin wall 14, and a holding part 34 which is carried by the body part and supported on the other (rear) side 32 of the thin wall 14 and separated from the body part 30. The holding part 34 is formed by holding elements 36 which project flexibly from the body part 30 in direction of its outer surface and whose free end has an inclined surface 38 for supporting the body part 30 without play on the rim or edge 40 of the opening 12 in the thin wall 14. Because of the symmetry of forces, it is advantageous, e.g., according to FIGS. 1A, 1B, to provide two holding elements 36-1 and 36-2 which are arranged diametrically relative to one another and which are acted upon by spring arrangements 42, for example, a coil spring 42 common to the two holding elements 36-1 and 36-2 or a coil spring 42-1, 42-2 (FIG. 27A) in such a way that the holding elements 36 are forced in the direction of the rim 40 of the through-opening 12. As is shown in FIG. 4B, the holding elements 36-1, 36-2 can be levers 44 which are arranged at a distance A from the (rear) surface 32 of the thin wall 14 around an axis 46 parallel to the plane of the thin wall 14. The angle of rotation of the lever 44 is limited by stop arrangements 48, while in FIG. 4B the holding elements 36 are arranged so as to be rotatable to a limited extent around axis 46 at a distance A from the (rear) surface of the thin wall.

Figure 3A:
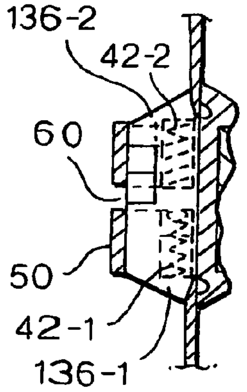
FIG. 3A shows an embodiment form of an associated holding part.
Figure 3B:
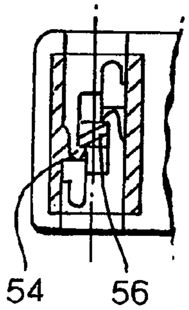
FIGS. 3B and 3C show two axial sectional views through the holding part according to FIG. 3A.
Figure 3C:
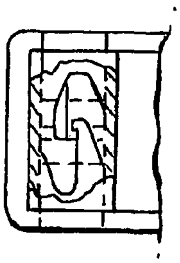
Figure 6A:
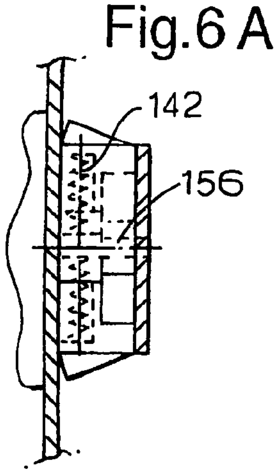
FIG. 6A is a side view of another embodiment form of the handle according to the invention partially in section.
Figure 6B:
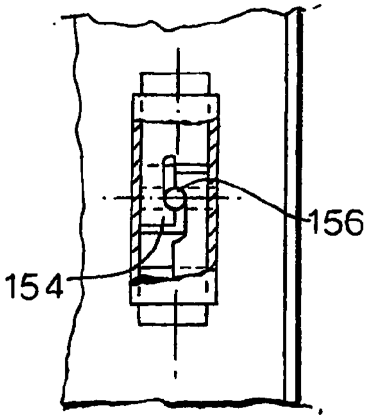
FIG. 6B is a view from the right-hand side, referring to FIG. 6*a;*

According to the view in FIG. 3A, the arrangement of the holding elements 136-1, 136-2 is carried out in such a way that they are arranged as slides 52 which are arranged so as to be axially displaceable in a cylinder 50 that is rectangular in cross section and parallel to the plane of the thin wall 14 or 22, which slides 52 are held against the pressure spring force of the spring 42 by a hook arrangement 54 which locks between the slides 52 themselves or in the cylinder 50, see, e.g., FIG. 3B, with the hooks 54 or (in FIG. 6B) with the hooks 154 which are supported at a wedge 56 or at a pin 156.

Figure 5A:
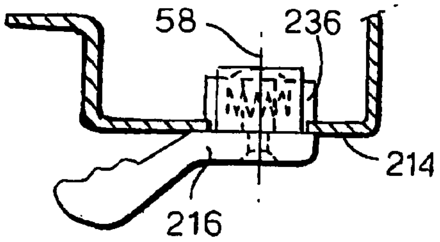
FIG. 5A shows the same embodiment form in section.
Figure 5B:
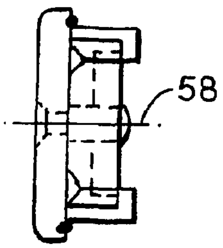
FIG. 5B shows the same embodiment form from the side.
Figure 5C:
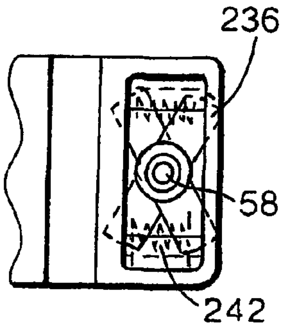
FIG. 5C is a bottom view of the same embodiment form.

According to FIGS. 5A, 5B and 5C, the holding elements 236 shown in the figures are levers 236 which are arranged so as to be rotatable in a defined manner around an axis 58 extending perpendicular to the thin wall 214.

Figure 8B:
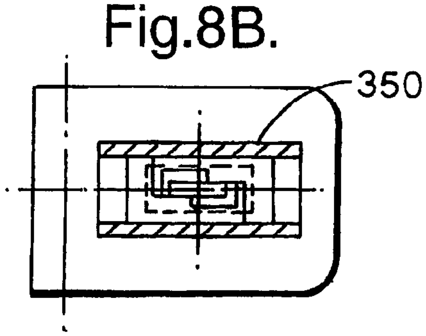
FIGS. 8B, 8C shows different positions and views of the handle according to FIG. 8A during the fastening process.
Figure 8A:
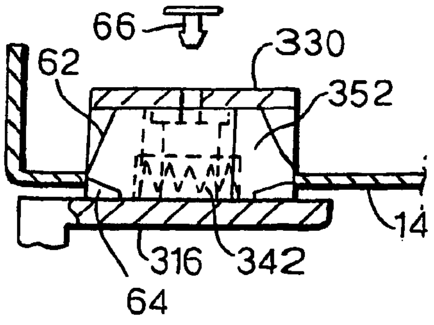
FIG. 8A is a side view referring to FIG. 7B.
Figure 8C:
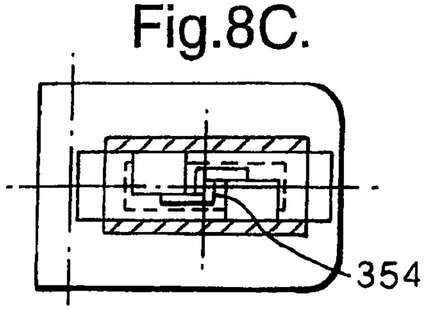
Figure 8D:
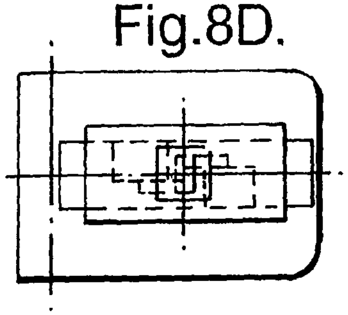
FIG. 8D shows the angular head of a plug.
Figure 8E:
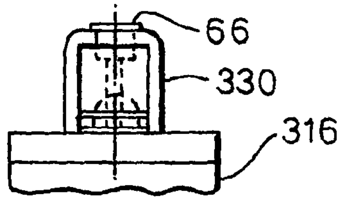
FIG. 8E is a view from the left-hand side of the arrangement shown in FIG. 8A.
Figure 8F:
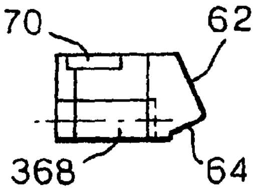
FIGS. 8F, 8G and 8H are three different views of the associated holding element.
Figure 8G:
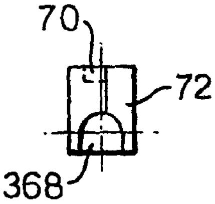
Figure 8H:
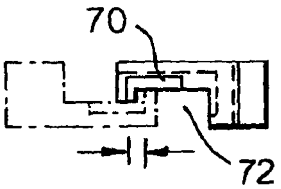

The cylinder 50 can also have a partial dividing wall or undercut or an opening edge 60 at which the slide can be supported axially by a shoulder or a hook. For example, FIG. 8A shows a holding plate 316 with a body part 330 in which slides 352 can move back against the force of a spring 342 through the edges of the opening when pushed in as a result of the bevel 62 (see FIG. 8A) until the edge has reached the clamping surface 64, in which position the spring 342 presses the two fastening elements 352 against the edges of the opening and securely connects the holding plate 316 to the thin wall 14. In order to prevent the loss of the holding elements 352 before being mounted in an opening, they are hooked to one another mutually by means of hooks 354 (see FIG. 8C). Nevertheless, it is possible for them to deflect with respect to one another when pushed in and to reach the position shown in FIG. 8B. FIG. 8D shows that the middle position is secured by a fixing plug in the moved out state. Further, the fixing plug 66 prevents the removal of the handle in that the holding elements 352 cannot be pushed back again into the cylindrical housing (see FIG. 8D). The holding element shown in FIGS. 8F, 8G and 8H as an individual part also shows the space 368 for the pressure spring 342. An offset path 70 receives the tip of the fixing plug 66 and makes it possible for the holding elements to carry out only a limited lifting movement. Another offset 72 makes it possible for the two holding elements which are movable relative to one another to slide next to one another.

Figure 7A:
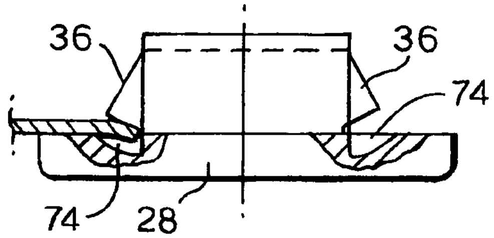
FIG. 7A is a side view of a handle arrangement suitable for bulging sheet metal.
Figure 7B:
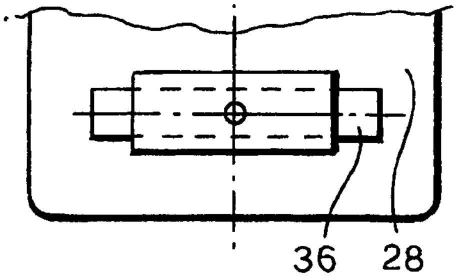
FIG. 7B is a rear view of a differently constructed handle.
Figure 7C:
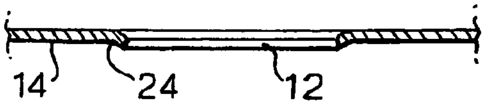
FIG. 7C is a sectional view of the associated sheet metal.

FIG. 7C is a sectional view showing a thin wall 14 of sheet metal in which areas of the opening rims bulge due to high loading. In this case, it is advantageous when the head part has a recess 74 in the area of the holding elements in which the bulging rim areas 24 can be received. This enables a fastening without play by means of pushing the holding element 36 further.

Figure 9A:
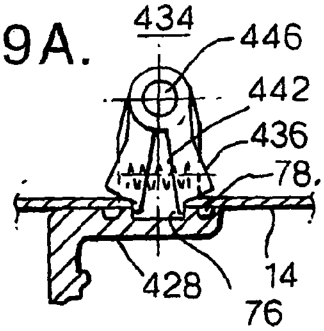
FIG. 9A shows a top view of another handle according to the invention.
Figure 9B:
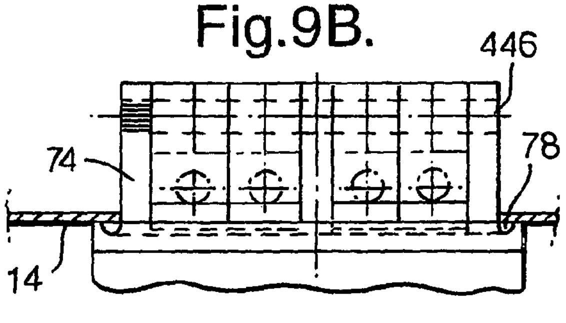
FIG. 9B shows a side view referring to FIG. 9A.
Figure 10:
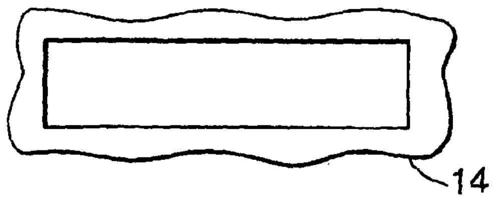
FIG. 10 shows the associated opening of the handle referring to FIG. 9A.

FIG. 9A is a front view and FIG. 9B is a side view showing a holding plate 434 which is composed of four pairs of holding elements lying next to one another. The construction is similar to that shown in FIGS. 4A, 4B, but a shared pin 446 is provided for holding the holding elements 436 that are located opposite one another. The axial pin 446 is held by means of three supports 74, one support receiving a corrugated surface of the end of the axial pin so as to press upon it.

At their end, the holding elements 436 have a projection 76 which, in combination with a recess in the head part 428, leads to a limiting of the rotational path due to the spring force 242. The particular advantage in this respect is also that the head part 428 and the body part formed by the supports 74 can also be injection molded in a simple manner, although a groove 78 is provided in this case for a seal which would normally require injection molding dies with sliding arrangements.

In the embodiment form according to FIGS. 11A, 11B, 11C, 11D, the holding elements 536 are formed by two metal pieces or plastic pieces which lie next to one another. They form projections and recesses that are directed toward one another such that the two holding elements 536-1, 536-2 can be drawn back against the force of the spring 542 by a rotatable tool or key 82 by rotating the tool 82 and the handle can accordingly be removed from the thin wall such as a door leaf 514. The construction is advisably carried out in such a way that the lever 82 stays in the opened position automatically so that when there is a plurality of handles they can all be brought into the open position simultaneously and all handles can accordingly be removed from the door leaf simultaneously.

Figure 11A:
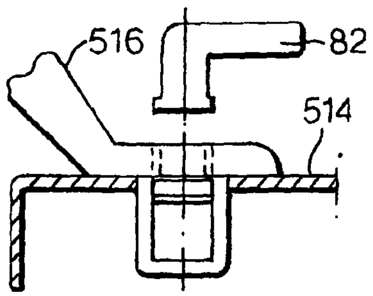
FIGS. 11A, 11B, 11C, 11D show different views of a handle according to the invention that can be unlocked by means of a key.
Figure 11B:
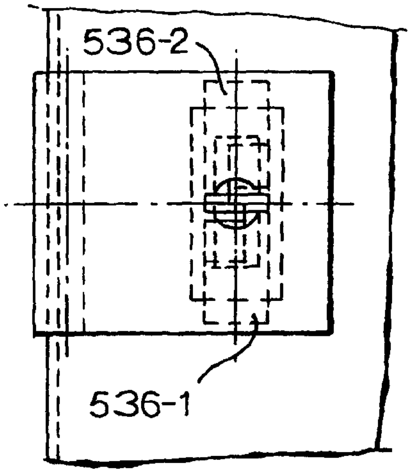
Figure 11C:
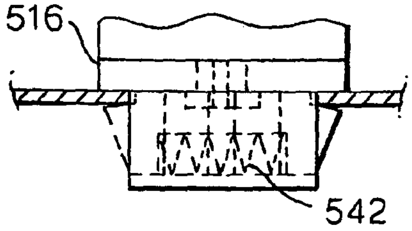
Figure 11D:
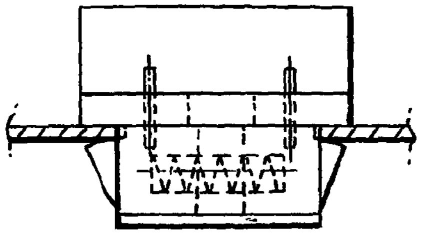
Figure 11E:
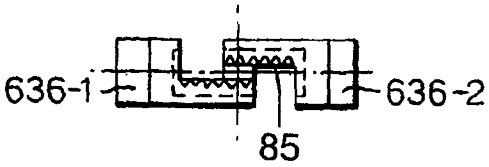
FIGS. 11E and 11F show a modified embodiment form of a handle that can be unlocked by means of a key.
Figure 11F:
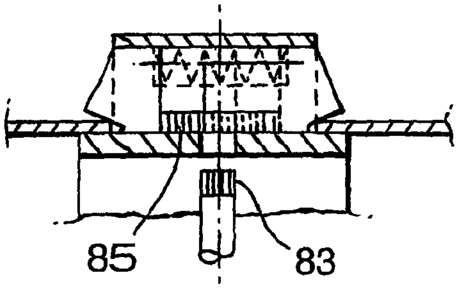

In the embodiment form according to FIGS. 11E and 11F, the tool is provided with a pinion 84 which can engage in corresponding teeth 86 of the two holding elements 636-1, 636-2 and makes it possible for the two holding elements to be drawn back into the housing when the tool and pinion 84 are turned in order to pull the housing out of the opening in the thin wall.

It is possible to open in this way from both sides of the handle, that is, also from the outer side of the door leaf; accordingly, a blind mounting can also be disassembled again.

Figure 12A:
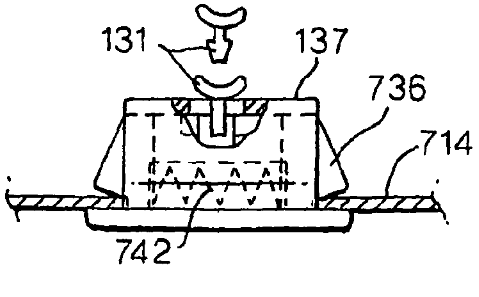
FIGS. 12A, 12B and 12C show different views of another handle that can be unlocked by means of a key.
Figure 12B:
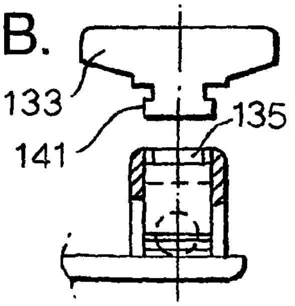
Figure 12C:
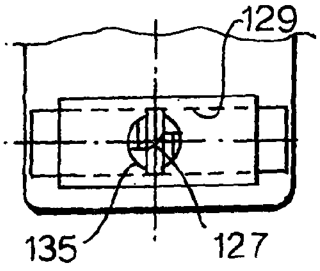

On the other hand, in the embodiment form according to FIGS. 12A, 12B, 12C, unlocking by means of a tool is possible only from the inner side.

Figure 12D:
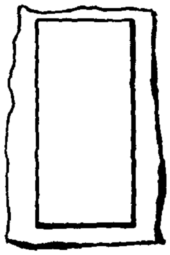
FIG. 12D shows the associated opening in a thin wall.
Figure 12E:
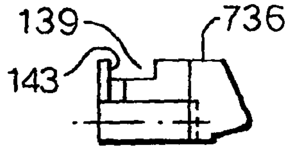
FIGS. 12E and 12F show an associated holding element in two different views.
Figure 12F:
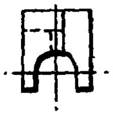
Figure 12G:
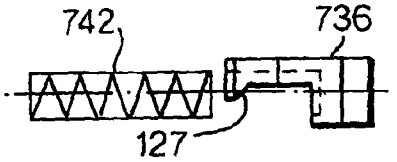
FIGS. 12G, 12H and 12I show additional views of this holding element during operation.
Figure 12H:
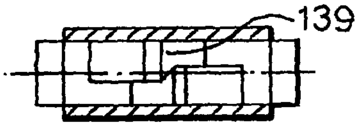
Figure 12I:
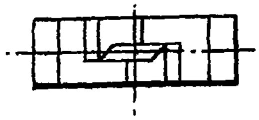
Figure 12J:
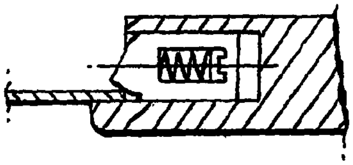
FIGS. 12J, 12K, 12L show another embodiment form of a suitable holding element.

Due to the inclined surface 127 of the holding elements 736 which extends at 45° (see particularly FIG. 12C and FIG. 12G), these holding elements 736 are forced outward in the direction of the channel walls 129 by the spring pressure of the spring 742, so that friction occurs in the channel and the holding elements are possibly already sufficiently fixed by this friction so that the fixing plug 131 shown in FIG. 12A is not needed. When the plug 131 is not required for securing the holding elements 736, the plug 131 also need not be removed when the unlocking key 133 is to be inserted through the opening 135 in the channel cover 137 in the offset area 139 formed by the two holding elements 736. When the key 133 is turned in the counterclockwise direction referring to FIG. 12A, the wings 141 of the key press against the endface 143 of the offset area 139 and move the holding element 736 into the channel until reaching the position shown in FIG. 121, at which time the key is turned by 90° and holds by itself. The entire unit shown in FIG. 12A can then be pulled out of the opening (shown in FIG. 12D) in the thin wall 714, including any additional handle elements which have likewise been brought into the pulled back position with a corresponding key.

In the embodiment form according to FIGS. 12J, 12K, 12L, 12M, 12N, 12O and 12P, the holding element is formed by a flat metal piece having an opening 84 for receiving the spring 42 and two oppositely located projections 86 which receive the spring 842 so as to secure it, so that that a handling unit is formed by the holding element and spring.

Figure 12K:
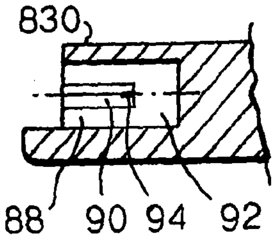
Figure 12L:
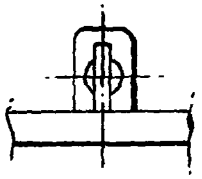
Figure 12M:
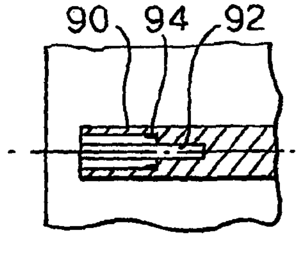
FIGS. 12M, 12N, 12O, 12P show another embodiment form of the holding element.
Figure 12N:
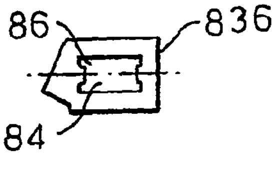
Figure 12O:
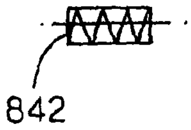
Figure 12P:

This unit can be received in the correspondingly shaped opening 88 in the body part 830 (see FIG. 12K). The cutout 90 provided for the spring is shorter than the corresponding cutout 90 for the holding element 836 so that the spring 842 obtains a contact surface when the holding element 836 is pushed into the position shown in FIG. 12J.

Figure 18B:
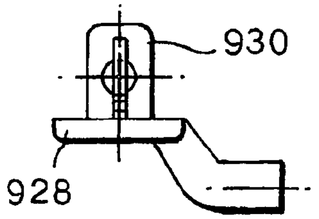
FIGS. 18A, 18B and 18C show different views of an alternative handle with features according to the invention.
Figure 18D:
FIGS. 18D, 18E, 18F, 18G show different views of the associated holding element with associated pressure springs.
Figure 18E:
Figure 18A:
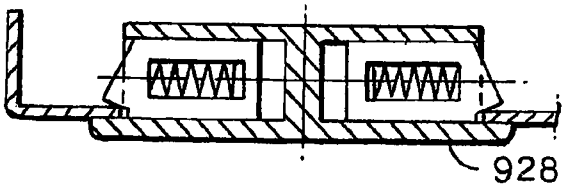
Figure 18F:
Figure 18G:
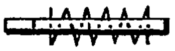
Figure 18C:
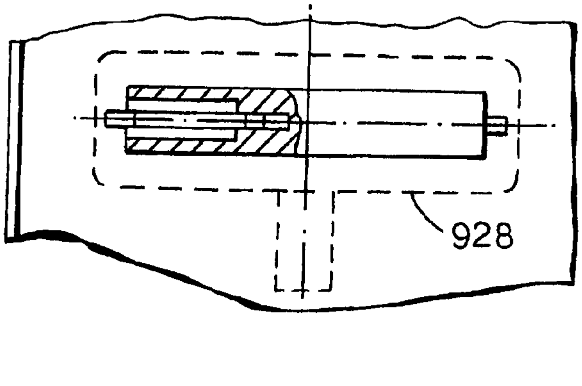
Figure 18H:
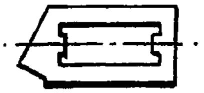
FIGS. 18H, 18I show another embodiment form of the holding element.
Figure 18I:

When a knob 92 is arranged at the end of the cutout 90 for the spring, the spring can be secured there and the holding element 836 is prevented from falling out with the spring 842. The embodiment form according to FIGS. 18A, 18B, 18C is similarly constructed. The fastening element in FIG. 18D and the spring in FIG. 18E are shown as fixedly assembled parts in FIGS. 18F and 18G. Holding projections are provided in FIG. 18H. In addition, the holding element in this case has a shape that differs from the flat shape for reasons of stability (see FIG. 18I).

Figure 19A:
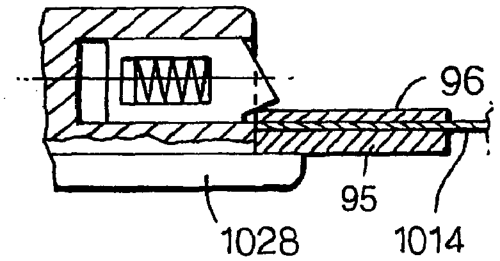
FIGS. 19A, 19B, 19C and 19D show different views of another holding plate with features according to the invention.
Figure 19B:
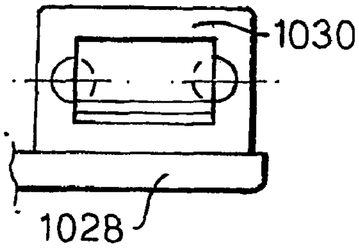
Figure 19C:
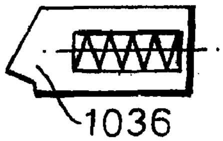
Figure 19D:
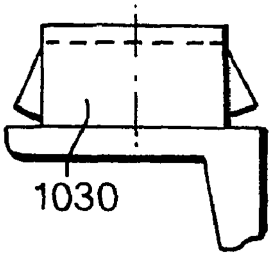

In the embodiment form shown in FIGS. 19A, 9B, 19C, two springs are provided which are inserted laterally into the associated holding element 36. The other half of the spring element is received by the body part 1030. FIG. 19A shows the characteristic feature that reinforcement plates 94, 96 are provided at both sides in cases where the wall material is very thin and are clamped in by the holding elements so that they also secure and support the thin door leaf 1014.

Decorative plates or panels can also be fastened in a similar manner.

Figure 19E:
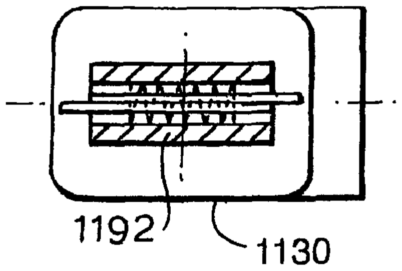
FIGS. 19E, 19F, 19G show the associated holding element as a single part.
Figure 19F:
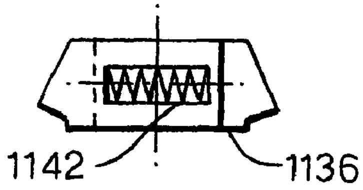
Figure 19G:
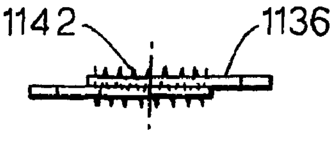

The embodiment form according to FIGS. 19D, 19E, 19F, 19G and 19H show two metal pieces 1136 which are located next to one another and which are held jointly by a spring 1144 in such a way that these three parts form a handling unit which is stable in itself, that is, they can be handled jointly and, if required, can then be inserted into a corresponding recess in the body part 1130 as can be seen in FIG. 19E.

By means of a knob 1192 arranged in this area, the construction can also be held in position.

Figure 19H:
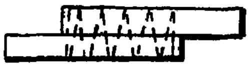
FIG. 19H shows the T-shape of the holding element from the front.

According to FIG. 19H, the two metal parts are thicker so that, together, they can receive the spring.

Figure 13A:
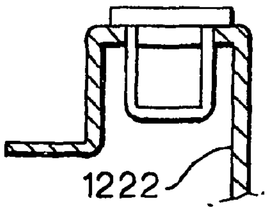
FIGS. 13A, 13B, 13C show an embodiment form with a body part that is welded to the holding plate.
Figure 13B:
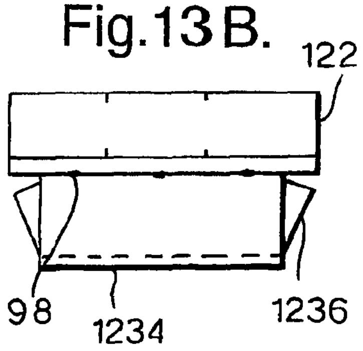
Figure 13C:
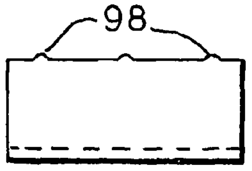
Figure 13D:
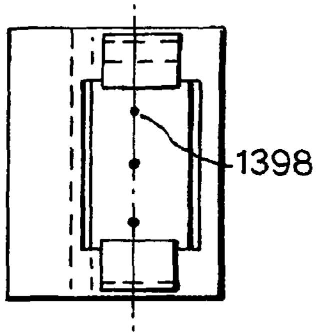
FIGS. 13D and 13E show an embodiment form with a holding spring that is welded to the body part.
Figure 13E:
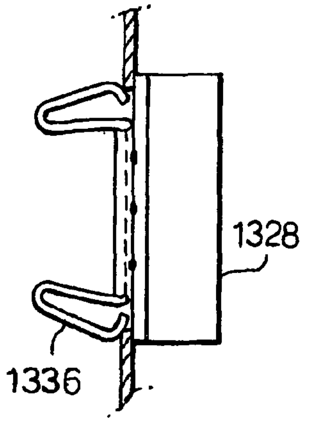

FIGS. 13A, 13B and 13C show an embodiment form in which the holding part 1234 is fastened to the head part 1228 by means of spot welding 98. In FIGS. 13E, 13D, a suitably formed leaf spring serving as a holding element is spot-welded at the body part 1328 (see weld 1398).

Figure 14A:
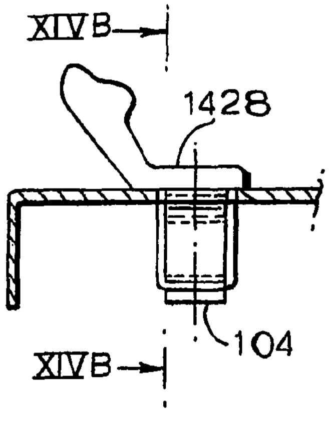
FIGS. 14A and 14B show an embodiment form with an insertable holding spring.
Figure 14B:
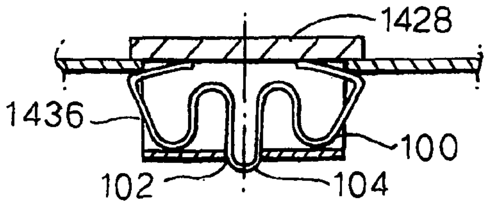
Figure 15A:
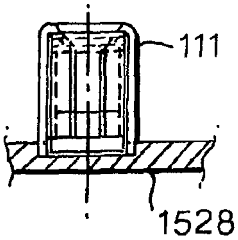
FIGS. 15A, 15B, 15C and 15D show an embodiment form in which a holding spring is screwed to a body part.
Figure 15B:
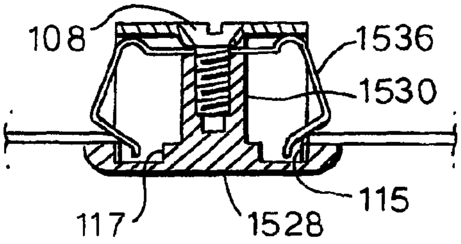
Figure 15C:
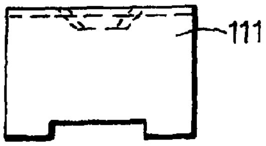
Figure 15D:
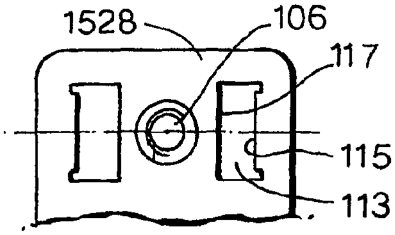
Figure 16A:
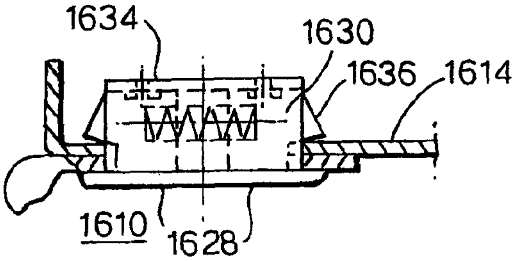
FIGS. 16A, 16B, 16C and 16D show different views of a holding element which is separate from the holding plate.
Figure 16B:
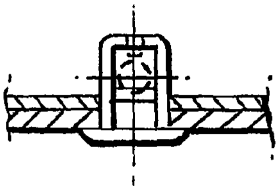
Figure 16C:
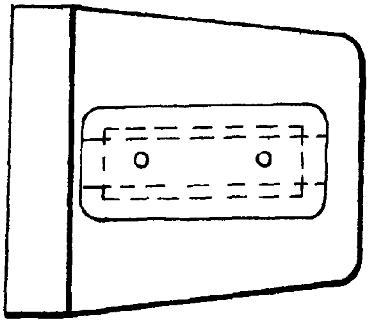
Figure 16D:
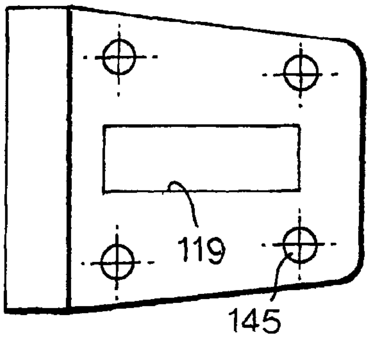

FIGS. 14A and 14B show a handle in which the leaf spring 1436 is inserted into a cavity 100 which is formed by the body part and which extends radially. This cavity forms a slot 102 or a projection and recess in which a projection and recess 104 of the spring 101 can lock the latter into position in a fixed manner.

In the arrangement which is shown in FIGS. 15A, 15B, 15C and 15D, the leaf spring 1536 is held by a head screw 108 that is screwed into a threaded bore hole 106 formed by the body part 1530. A cover 111 can be provided for improved guidance. This cover 111 is U-shaped and engages by the ends of its legs in recesses 113 in the head part 1528. Further, these recesses 113 form stop surfaces 115 and 117 for the ends of the spring 1536.

FIGS. 16A, 16B, 16C and 16D show a handle in which the holding plate has an opening 119 like the thin wall 1614, wherein the holding part 1634 and the body part 1630 have their own head part 1628. Further, the holding plate shown in FIG. 16D has bore holes 145 for an alternative fastening by means of head screws.

Figure 17A:
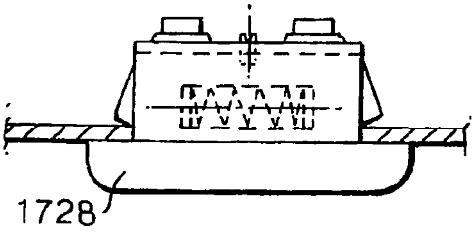
Figure 17B:
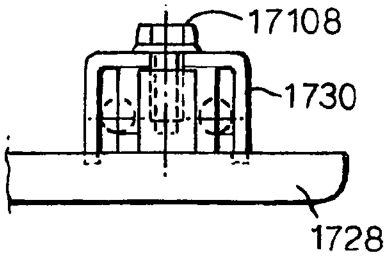
Figure 17C:
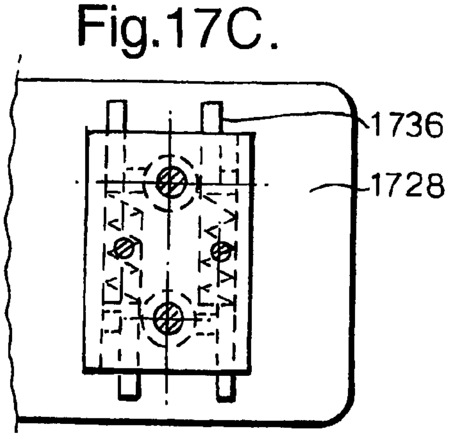

In the embodiment form shown in FIGS. 17A, 17B and 17C, the head part 1728 and body part 1730 are two parts which are screwed together, wherein two screws 17108 are used. In order to increase the stability, the pairs of holding elements 1736 are doubled and are arranged symmetrically on the right-hand and left-hand side of the screw arrangement 17108.

In the embodiment form shown in FIGS. 20A to 20L, the head part 1828 and body part 1830 are two different structural component parts which are screwed together 18107. The holding elements 1836 have an elongated hole 121 through which the screw 18107 is guided and the axial movement of the holding element 1836 is accordingly limited. The head part 1828 forming the handle has a groove 123 for a circumferential ring seal 125.

Figure 21:
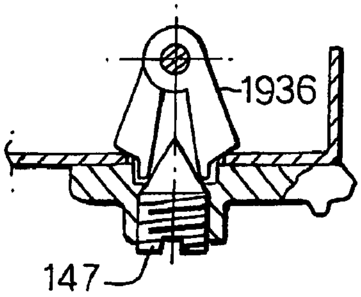
FIG. 21 shows a sectional top view of an embodiment form with a wedge screw.
Figure 23:
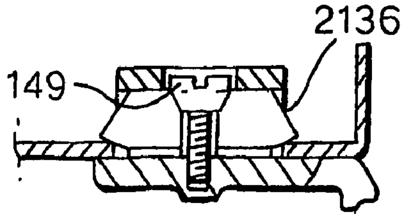
FIG. 23 shows a view similar to FIG. 21 to illustrate a wedge device in the form of a cabinet with a conical head.

FIG. 21 is a cross-sectional view in partial section showing a holding plate whose holding elements 1936 are spread by means of a screw with a conical base 147. In the embodiment form shown in FIG. 23, the head of the screw 149 is conical and presses the two holding elements 2136 apart.

Figure 22A:
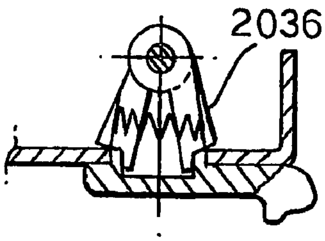
FIG. 22A shows an embodiment form with a round opening in a top view in partial section.

Compared to a construction according to FIG. 22A in which a spring spreads the two holding element 2036, the embodiment forms with the conical screw have the disadvantage that the screw must be re-tightened manually when the sheet metal edges become rounded or bulge out subsequently under load. A spring readjusts automatically and compensates automatically.

Figure 2:
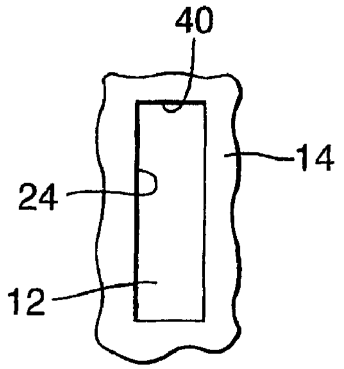
FIG. 2 shows an opening in the thin wall, which opening is suitable for the handle which is constructed according to the invention.
Figure 22B:
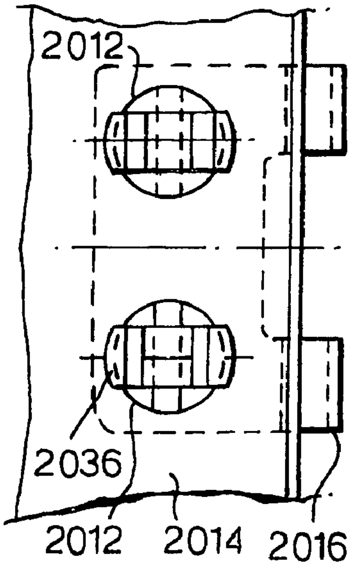
FIG. 22B is a bottom view according to FIG. 22A of a holding plate requiring two round openings.
Figure 22C:
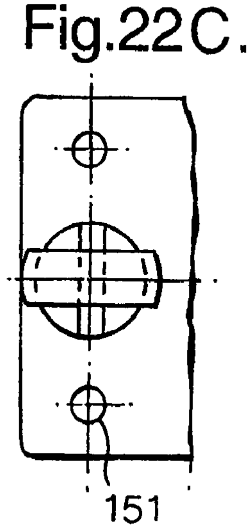
FIG. 22C shows a top view of a holding plate with a round opening and two guide holes.

The opening in the thin wall need not necessarily be rectangular as is shown, for example, in FIG. 2. In itself, it can also have any other shape, e.g., oval or round. A round embodiment form can be seen in FIG. 22B, in which case, however, means may have to be provided for preventing rotation, which is provided when the shape of the opening is rectangular, but not when the opening is round. The first holding plate (on the top with reference to FIG. 25A) can be secured, for example, by the second holding plate at the bottom in case these holding plates are connected to one another or by the arrangement of two round openings 2012 which are arranged at a distance from one another, as is shown in FIGS. 22B, or also by additional pins 151 which are cast integral with the hinge part and which prevent rotation (see FIG. 22C) insofar as there are corresponding bore holes in the door leaf which accept these pins.

Figure 24A:
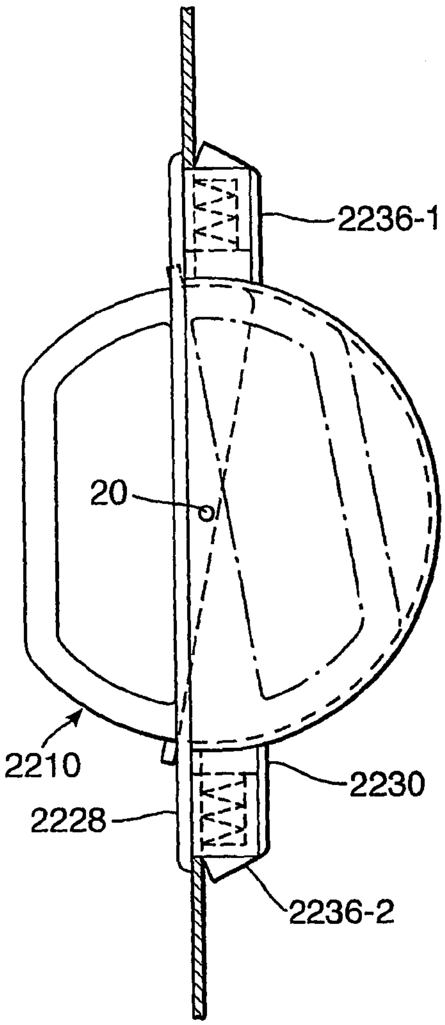
FIG. 24A shows a view in longitudinal section of a handle that can be recessed into a housing, which housing is held in an opening by means of holding elements according to the invention.

FIG. 24A is a view in longitudinal section showing a handle 2210 which can be lowered into a housing 18 that is held by means of fastening elements 2236-1, 2236-2, according to the invention, in an elongated, rectangular opening 2212.

The handle 2210 can be rotated around an axial pin 20 supported by the housing 18 until the handle is completely received by the housing; the back of the handle then closes the housing on the outer side and a smooth surface is formed.

Figure 24B:
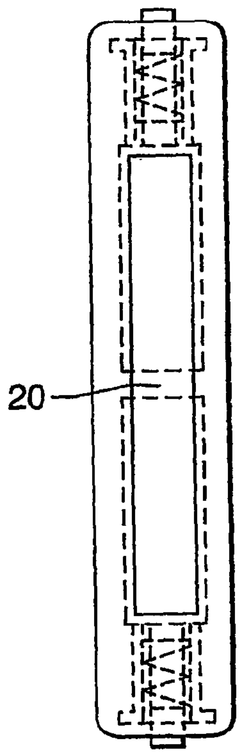
FIG. 24B shows a rear view of the arrangement according to FIG. 24A.
Figure 24C:
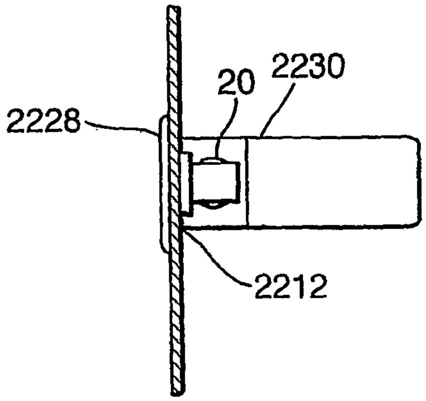
FIG. 24C shows a side view of the arrangement according to FIG. 24C.

FIG. 24B shows a rear view of the arrangement according to FIG. 24A, and FIG. 24C is a side view of the arrangement according to FIG. 24A.

Figure 25A:
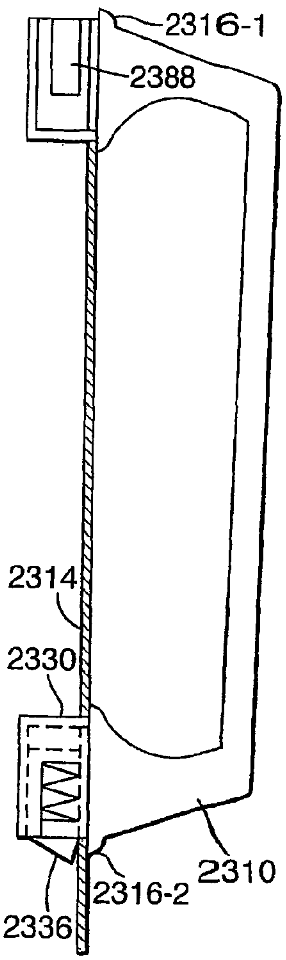
FIG. 25A is a longitudinal view in partial section showing a handle according to the invention that can be fastened in two round holes.
Figure 25B:
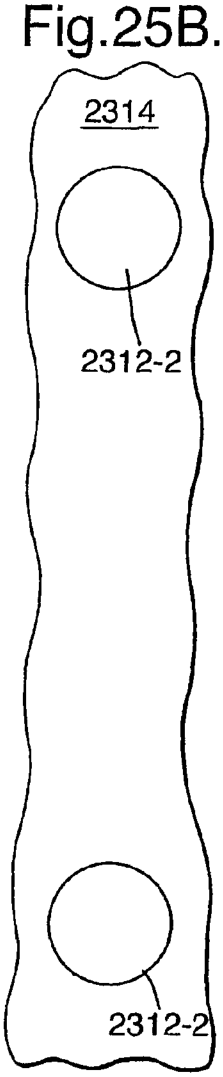
FIG. 25B shows the associated round holes in a thin wall.
Figure 25C:
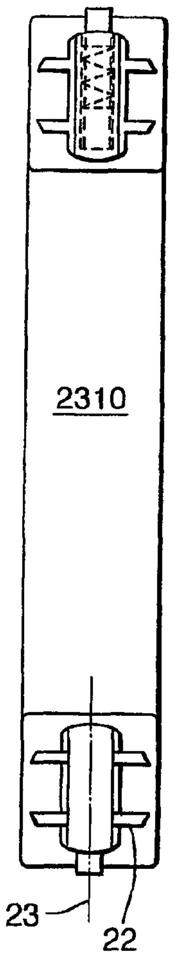
FIG. 25C shows a rear view of the arrangement according to FIG. 25A.
Figure 25D:
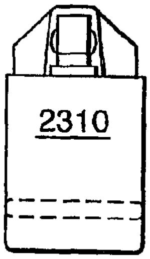
FIG. 25D shows a front view of the arrangement according to FIG. 25A.

FIG. 25A is a longitudinal view in partial section showing a handle which can be fastened, according to the invention, in two round holes 2312-1 and 2312-2 and whose two ends support a holding element, respectively, which lies in the direction of the handle axis. FIG. 25B shows the associated round holes 2312-1 and 2312-2 in a thin wall 2314, while FIG. 25C is a rear view showing the arrangement according to FIG. 25A. Webs extending perpendicular to the handle axis 23 provide for fixing in the round hole 2312 in this direction perpendicular to the handle axis 23.

Figure 25E:
FIG. 25E shows a front view of the holding element of FIG. 25A.
Figure 25F:
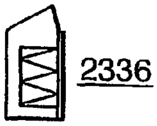
FIG. 25F shows a side view of the holding element of FIG. 25A.

FIG. 25E is a front view showing the shape of the holding element 2336 used in this case which can be inserted into a suitably shaped recess 2388 such that it can be locked (see the top part of FIG. 25A). The bottom part of FIG. 25A shows this state. FIG. 25F is a side view of the holding element of FIG. 25A.

Figure 26:
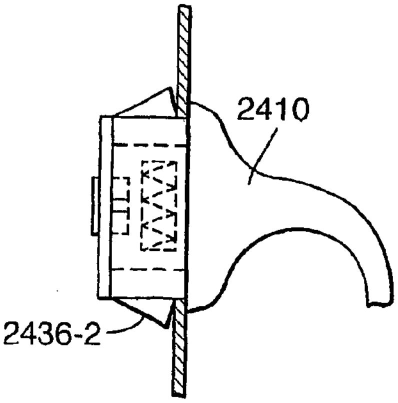
FIG. 26 shows an alternative embodiment form of the handle according to FIG. 25A.

FIG. 26 shows an alternative embodiment form of the handle according to FIG. 25A having two oppositely located holding elements 2436-1 and 2436-2 which provide for a flexible clamping in direction of the handle axis 23.

Figure 27A:
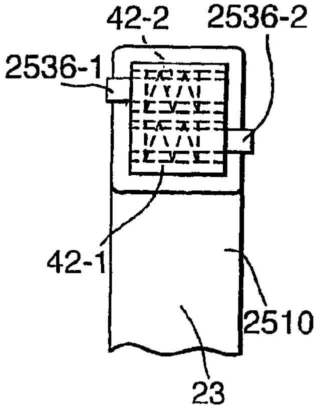
FIG. 27A shows another embodiment form of the handle according to FIG. 25A.

FIG. 27A shows another embodiment form of the handle 2510 in which the holding elements 2536-1 and 2536-2 are received in recesses extending perpendicular to the handle axis 23. Recesses of this kind can be produced in a simple manner by injection molding because no sliders are required in the injection molding die (the die is opened in this direction, that is, perpendicular to the handle axis). The two holding elements 2536-1 and 2536-2 are not coaxial to one another, but are parallel to one another at a distance from one another because otherwise the holding elements are too short and the axial guide is not sufficiently stable.

Figure 27B:
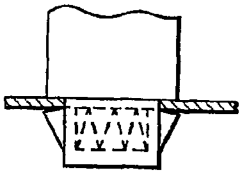
FIG. 27B shows a side view of the embodiment form of FIG. 27A.

FIG. 27B shows a side view of the embodiment form of FIG. 27A.

Figure 27C:
FIG. 27C shows a view of one of the holding elements of the handle according to FIG. 27A.
Figure 28A:
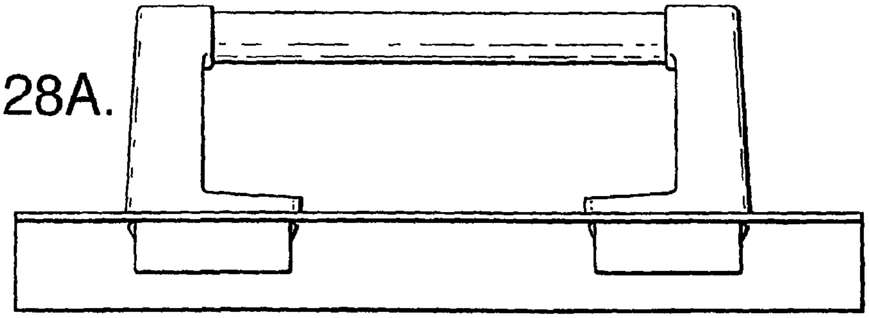
FIG. 28A is a side view showing a handle which can be fastened in suitable openings in a thin wall by means of end supports with projections proceeding from its base plate with snap-in devices in that wedge plates which are displaceable against spring force and accommodated in the projections engage behind a rim of an opening after the projections pass through the openings with a sloping endface edge, see FIG. 28D.
Figure 28B:
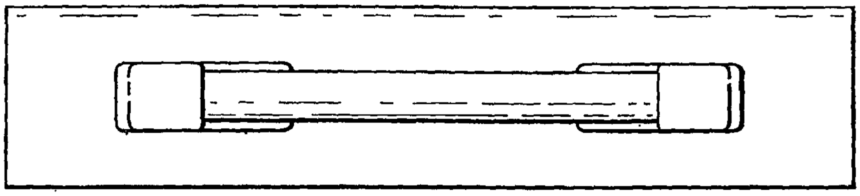
FIG. 28B is a view (top view) of the handle that is rotated by 90 degrees with respect to FIG. 28A.
Figure 28C:
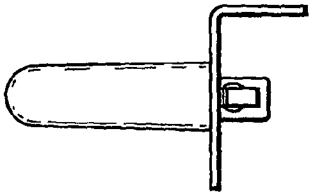
FIG. 28C is a view of the handle from the left-hand side with reference to FIG. 28B.
Figure 28D:
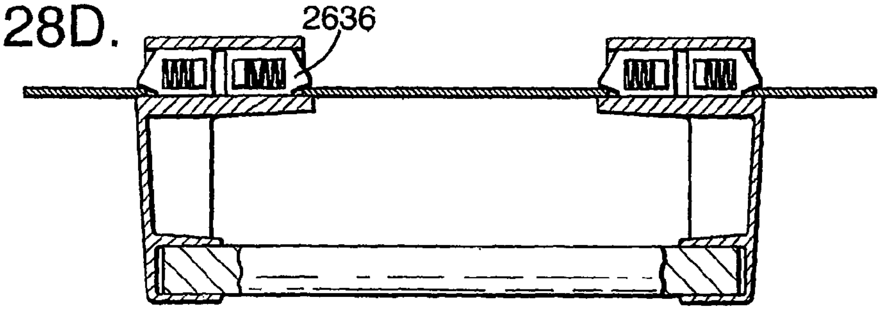
FIG. 28D is a view in partial section that is rotated by 180 degrees with respect to FIG. 28A.
Figure 28E:
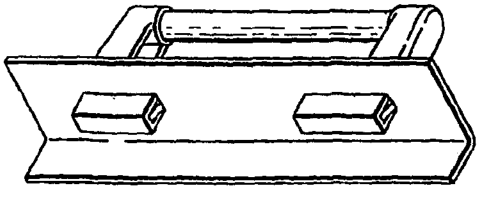
FIG. 28E is a perspective view obliquely from below of the handle according to FIG. 28A.
Figure 28F:
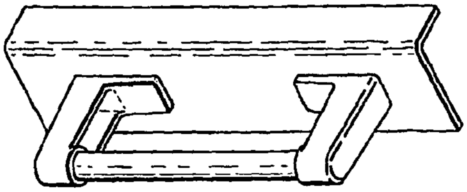
FIG. 28F is a perspective view obliquely from above of the handle according to FIG. 28A, wherein the handle is fastened in a beveled thin wall such as a sheet-metal cabinet door in all of the FIGS. A to F.
Figure 29A:
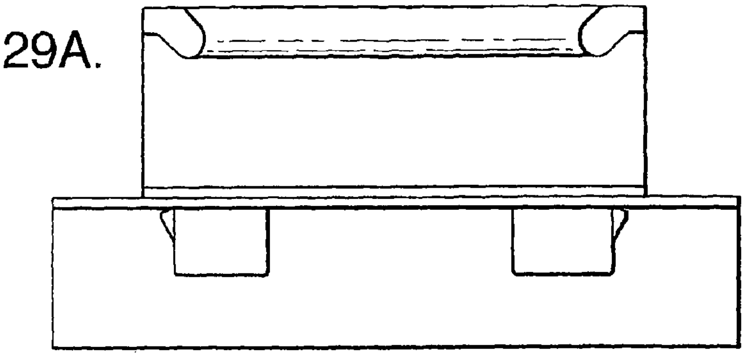
FIG. 29A is a side view of a handle which can be fastened in suitable openings in a thin wall by means of projections proceeding from the base plate of the handle with snap-in devices in that wedge plates which are displaceable against spring force and accommodated in the projections engage behind a rim of an opening after the projections pass through the openings with a sloping endface edge, see FIG. 29D.
Figure 29B:
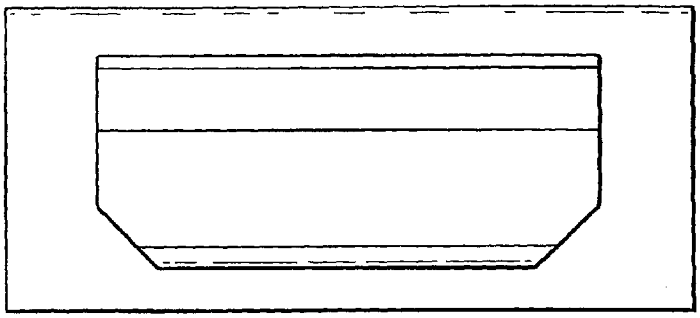
FIG. 29B shows a view (top view) of the handle that is rotated by 90 degrees with respect to FIG. 29A.
Figure 29C:
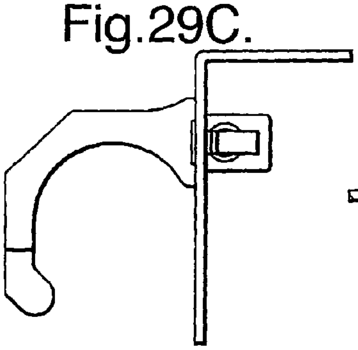
FIG. 29C is a view of the handle according to FIG. 29B from the left-hand side.
Figure 29D:
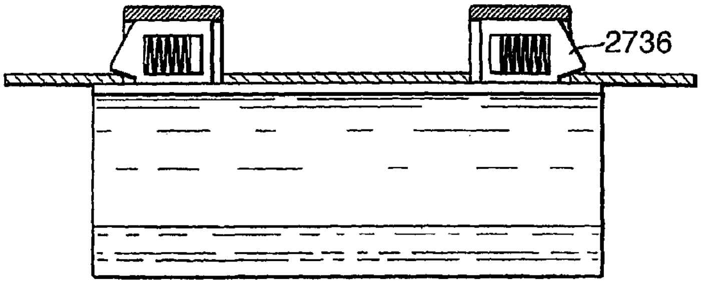
FIG. 29D shows a view in partial section which is rotated by 180 degrees with respect to FIG. 29A.
Figure 29E:
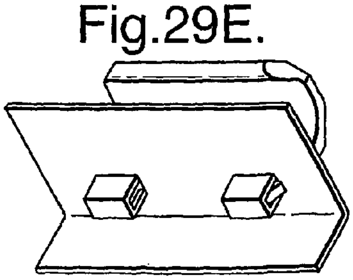
FIG. 29E is a perspective view obliquely from below of the handle according to FIG. 29A.
Figure 29F:
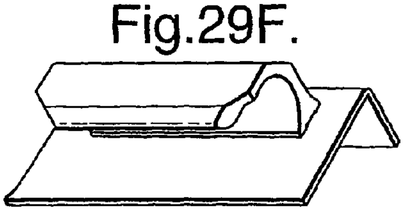
FIG. 29F is a perspective view obliquely from above of the handle according to FIG. 29A, wherein the handle is fastened in a beveled thin wall such as a sheet-metal cabinet door in all of the FIGS. A to F.
Figure 30A:
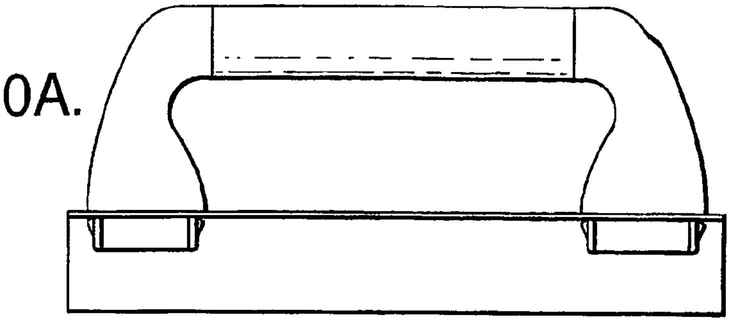
FIG. 30A is a side view showing a handle which can be fastened in suitable openings in a thin wall by means of end supports with projections proceeding from its base plate with snap-in devices in that wedge plates which are displaceable against spring force and accommodated in the projections engage behind a rim of an opening after the projections pass through the openings with a sloping endface edge, see FIG. 30D.
Figure 30B:
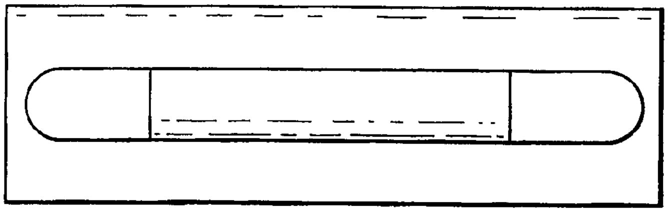
FIG. 30B shows a view (top view) of the handle that is rotated by 90 degrees with respect to FIG. 30A.
Figure 30D:
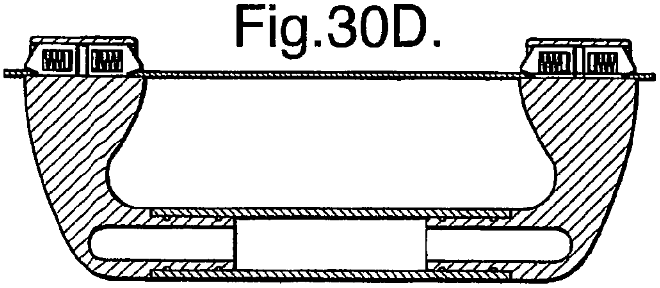
FIG. 30D shows a view in axial section which is rotated by 180 degrees with respect to FIG. 30A.
Figure 30C:
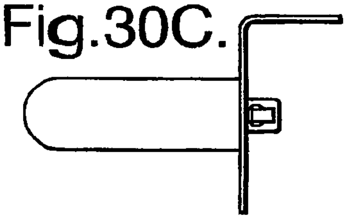
FIG. 30C is a view of the handle according to FIG. 30B from the left-hand side.
Figure 30E:
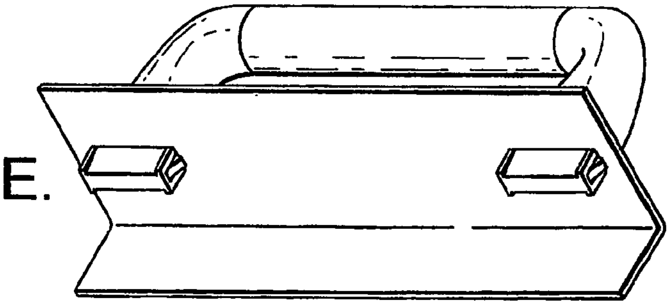
FIG. 30E is a perspective view obliquely from below of the handle according to FIG. 30A.
Figure 30F:
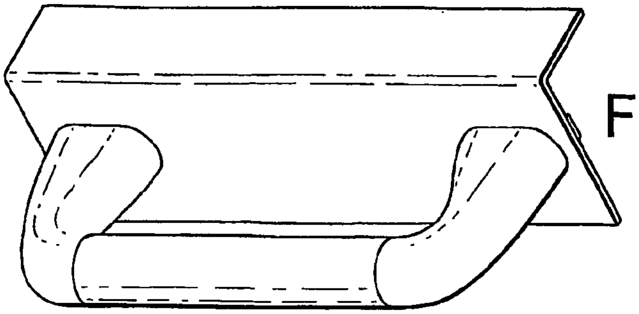
FIG. 30F is a perspective view obliquely from above of the handle according to FIG. 30A, wherein the handle is fastened in a beveled thin wall such as a sheet-metal cabinet door in all of the FIGS. A to F.
Figure 31A:
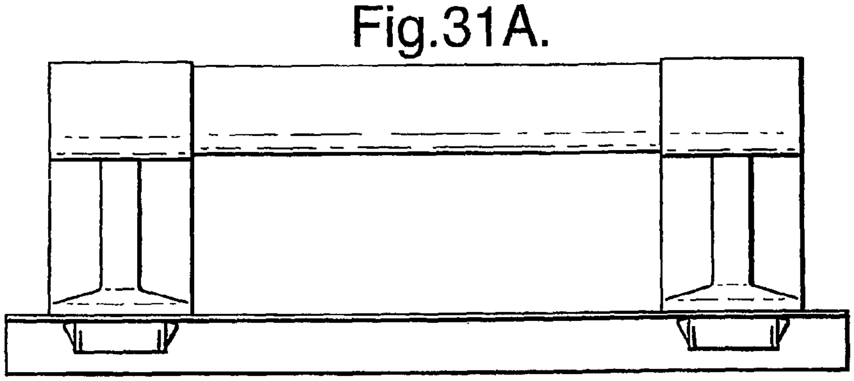
FIG. 31A is a side view showing a handle which can be fastened in suitable openings in a thin wall by means of end supports with projections proceeding from its base plate with snap-in devices in that wedge plates which are displaceable against spring force and accommodated in the projections engage behind a rim of an opening after the projections pass through the openings with a sloping endface edge, see FIG. 31D.
Figure 31B:
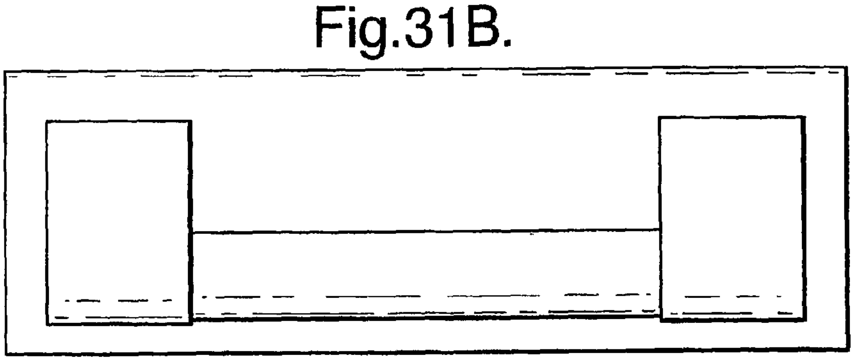
FIG. 31B shows a view (top view) of the handle that is rotated by 90 degrees with respect to FIG. 31A.
Figure 31C:
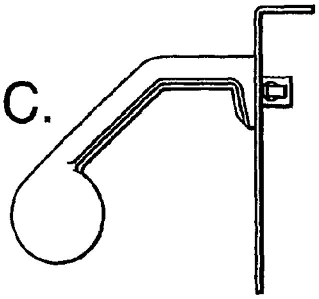
FIG. 31C is a view of the handle according to FIG. 31B from the left-hand side.
Figure 31D:
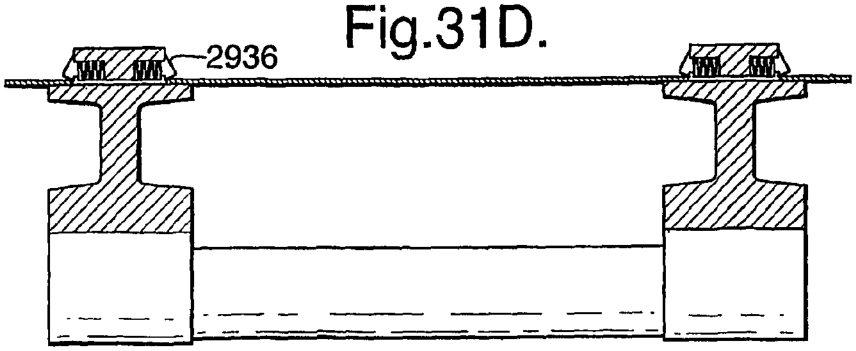
FIG. 31D shows a view in axial section which is rotated by 180 degrees with respect to FIG. 31A.
Figure 31E:
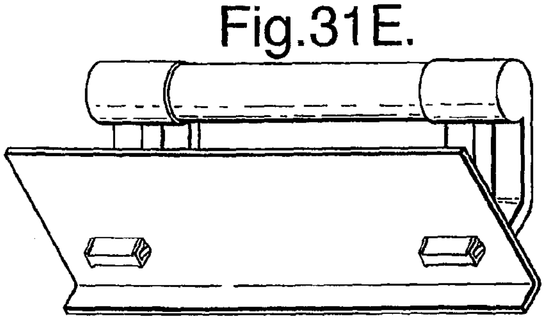
FIG. 31E is a perspective view obliquely from below of the handle according to FIG. 31A.
Figure 31F:
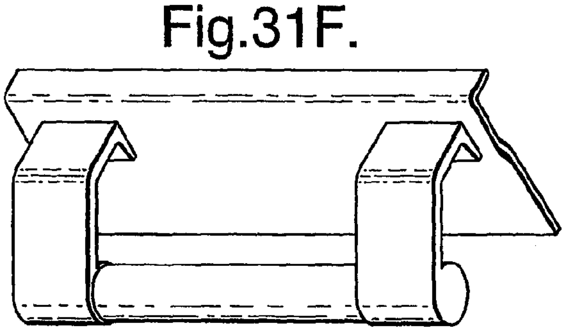
FIG. 31F is a perspective view obliquely from above of the handle according to FIG. 31A, wherein the handle is fastened in a beveled thin wall such as a sheet-metal cabinet door in all of the FIGS. A to F.

FIG. 27C shows a view of one of the holding elements of the handle according to FIG. 27A.

FIGS. 28A to 28F, FIGS. 29A to 29F, FIGS. 30A to 30F and FIGS. 31A to 31F, in the figures designated by A, show a side view of a handle which can be fastened in suitable openings in a thin wall by means of end supports with projections which proceed from its base plate and which have snap-in devices in that wedge plates 2636, 2736, 2836 and 2936 which are displaceable against spring force and accommodated in the projections engage behind a rim of an opening after the projections are guided through the openings with a sloping endface edge.

The figures designated by B show a view (top view) of the respective handle that is rotated by 90 degrees with respect to the figures designated by A; the figures designated by C show a view of the respective handle from the left-hand side with reference to the figures designated by B; the figures designated by D show a view in partial section that is rotated by 180 degrees with respect to the figures designated by A; the figures designated by E show a perspective view obliquely from below of the respective handle according to the figures designated by A; the figures designated by F show a perspective view obliquely from above of the respective handle according to the figures designated by A. The respective handle is fastened in a beveled thin wall such as a sheet-metal cabinet door in all of the figures.

The handles differ only with respect to their shape, while the fastening is identical.

Figure 32A:
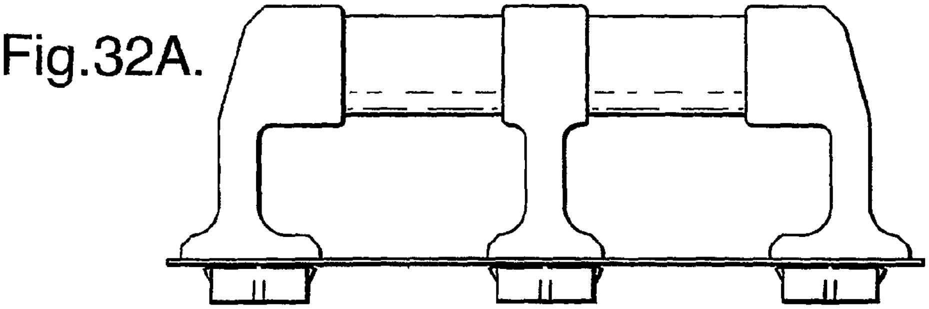
FIG. 32A is a side view showing a handle which can be fastened in suitable openings in a thin wall by means of center supports and end supports with projections proceeding from its base plate with snap-in devices in that wedge plates which are displaceable against spring force and accommodated in the projections engage behind a rim of an opening after the projections pass through the openings with a sloping endface edge, see FIG. 32G.
Figure 32B:
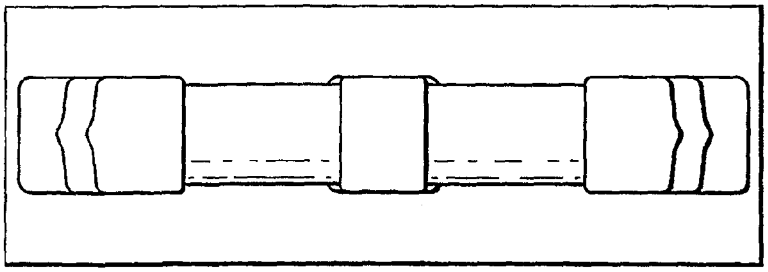
FIG. 32B shows a view (top view) of the handle that is rotated by 90 degrees with respect to FIG. 32A.
Figure 32C:
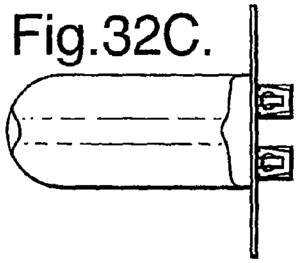
FIG. 32C is a view of the handle according to FIG. 32B from the left-hand side.
Figure 32D:
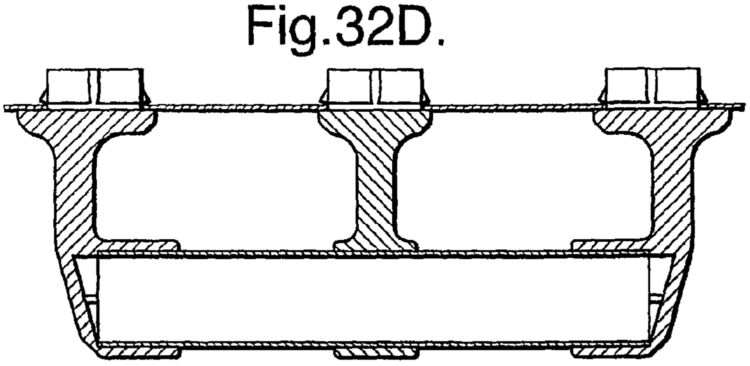
FIG. 32D shows a view in axial section which is rotated by 180 degrees with respect to FIG. 32A.
Figure 32E:
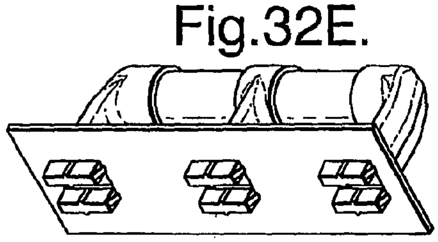
FIG. 32E is a perspective view obliquely from below of the handle according to FIG. 32A.
Figure 32F:
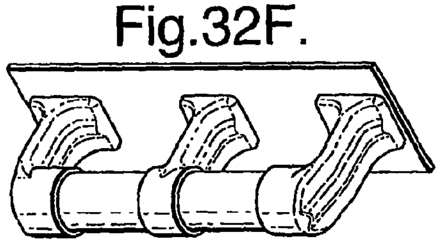
FIG. 32F is a perspective view obliquely from above of the handle according to FIG. 32A.
Figure 32G:
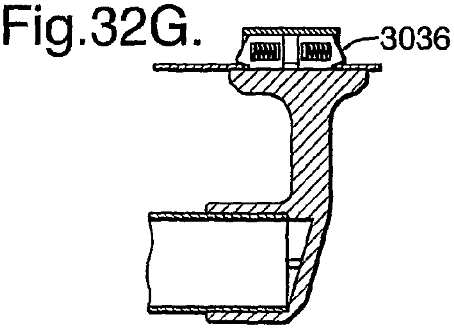
FIG. 32G is a detailed sectional view, wherein the handle is fastened in a beveled thin wall such as a sheet-metal cabinet door in all of the FIGS. A to F.

FIG. 32A is a side view showing a handle which can be fastened in suitable openings in a thin wall by means of center supports and end supports with projections proceeding from its base plate with snap-in devices in that wedge plates 3036 which are displaceable against spring force and accommodated in the projections engage behind a rim of an opening after the projections pass through the openings with a sloping endface edge, see FIG. 32G.

FIG. 32B shows a view (top view) of the handle that is rotated by 90 degrees with respect to FIG. 32A; FIG. 32C is a view of the handle according to FIG. 32B from the left-hand side; FIG. 32D shows a view in axial section which is rotated by 180 degrees with respect to FIG. 32A; FIG. 32E is a perspective view obliquely from below of the handle according to FIG. 32A; FIG. 32F is a perspective view obliquely from above of the handle according to FIG. 32A; and FIG. 32G is a detailed sectional view. The handle is fastened in a beveled thin wall such as a sheet-metal cabinet door in all of the figures.

The type of fastening shown here is particularly suitable for longer handles because they are supported not only at the ends, but also additionally at least once more over the course of the handle.

Figure 33A:
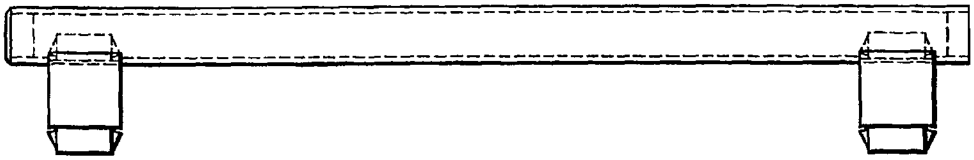
FIG. 33A is a side view showing a handle which comprises a handle bar and which can be fastened in suitable openings in a thin wall by means of center supports and end supports with projections proceeding from its base plate with snap-in devices in that wedge plates which are displaceable against spring force and accommodated in the projections engage behind a rim of an opening after the projections pass through the openings with a sloping endface edge, see FIG. 33E, wherein the fastening of the supports is carried out at the handle bar in an analogous manner.
Figure 33B:
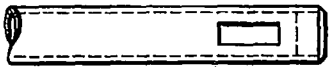
FIG. 33B shows a view (top view) of part of the handle bar that is rotated by 90 degrees with respect to FIG. 33A.
Figure 33D:
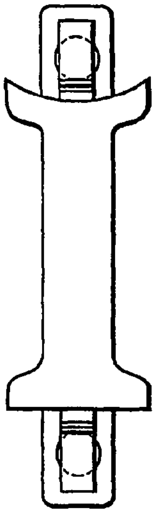
FIG. 33D shows a larger front view of the support with respect to FIG. 33C.
Figure 33C:
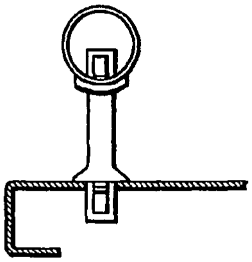
FIG. 33C is a view of the handle according to FIG. 33A from the left-hand side after mounting in a thin wall.
Figure 33E:
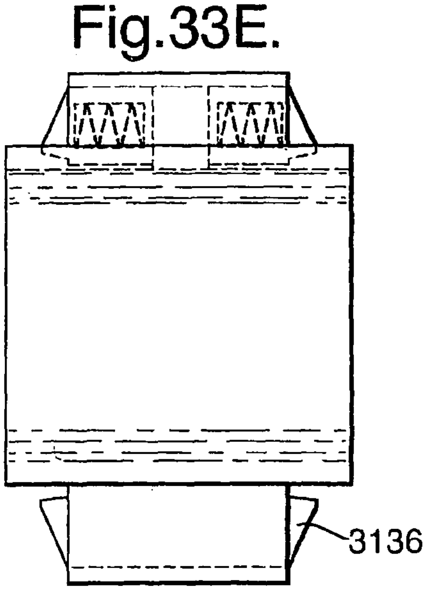
FIG. 33E shows a larger side view of the support with respect to FIG. 33C.

FIG. 33A is a side view showing a handle which comprises a handle bar and which can be fastened in suitable openings in a thin wall by means of center supports and end supports with projections proceeding from its base plate with snap-in devices in that wedge plates 3136 which are displaceable against spring force and accommodated in the projections engage behind a rim of an opening after the projections pass through the openings with a sloping endface edge, see FIG. 33E, wherein the fastening of the supports is carried out at the handle bar in an analogous manner. FIG. 33B shows a view (top view) of part of the handle bar that is rotated by 90 degrees with respect to FIG. 33A. FIG. 33C is a view of the handle according to FIG. 33A from the left-hand side after mounting in a thin wall. FIG. 33D shows a larger front view of the support with respect to FIG. 33A. FIG. 33E shows a larger side view of the support with respect to FIG. 33C.

This embodiment form can be used in a particularly flexible manner.

Figure 34A:
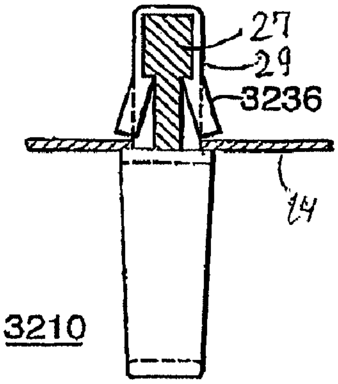
FIGS. 34A and 34B show different views of a handle which is outfitted with the snap-in fastening according to the invention.
Figure 34B:
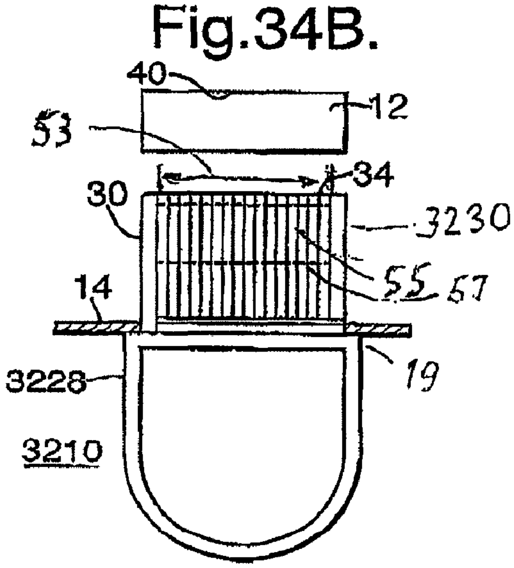

FIGS. 34A and 34B are two side views rotated by 90° showing a handle 3210 with a snap-in fastening for fixing the handle 3210 in a thin wall 14, such as a sheet-metal cabinet door, provided with an opening 12 as a mounting opening. The snap-in fastening comprises a head part 3228 with a flange 19 that covers the outer rim or edge 40 of the opening 12 after mounting and further comprises a body part 30 which proceeds from the head part 3228 and which extends through the opening after mounting. At its end 27, the body part 30 holds a spring 29 which is U-shaped when viewed from above and which is supported on the inner edge 40 of the opening 12 by the ends 31 of its legs. The U-shaped spring 29 has resiliently flexible projections 39 which project from the U-legs 35 into the aperture 37 enclosed by the legs 35 and which can be received in a positive engagement by corresponding recesses 41 in the body part 30 when mounted.

Figure 35A:
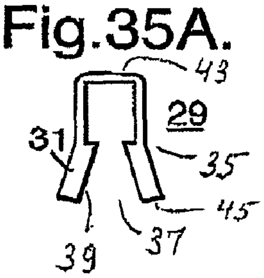
FIGS. 35A and 35B show the associated flat spring, a plurality of which can be inserted next to one another as a bundle.
Figure 35B:

As can be seen in particular from FIGS. 35A and 35B, the spring 29 is a flat structural component part having a U-profile when viewed from the top and has U-legs 35 which initially extend parallel from the bar 43 of the U with a first, small width and then, beginning in the area of the projections 39, extend with a second, greater width at an increasing distance from one another and are cut off (see reference number 45, FIG. 35A) at the end substantially at right angles to their extension such that when mounted as is shown in FIG. 34A they are supported on the opening rim 40 with a slight inclination relative to the plane of the thin wall 14.

Figure 36:
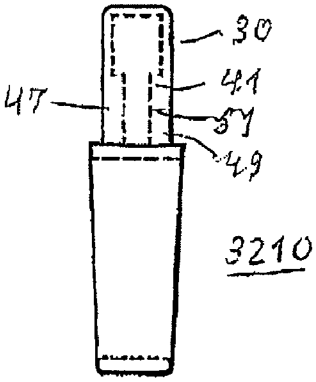
FIG. 36 shows a handle part which is suitable for the spring according to FIG. 35A.

As can be seen in FIG. 36, the body part has oppositely located grooves 47, 49 which form the recess 41 through the variation of the groove base 51 and which have a depth such that they are capable of receiving the U-legs 35 of at least one spring 29 at least during the mounting process.

The groove 49 can have a width 53 such that a bundle 55 of a plurality of flat springs 29 arranged next to one another can be accommodated as is shown in FIG. 34B in which an whole series of flat springs 29 forms a common fastening and supporting surface 57. Due to the fact that the individual legs of the individual springs can move independently from one another, the rim of the opening can be adapted to in a particularly excellent manner even when this rim is uneven. This produces a particularly stable fastening with a reduced total area pressure compare to the prior art.

Accordingly, it is also possible to use non-metallic materials, such as plastics, for the thin wall.

Figure 37:
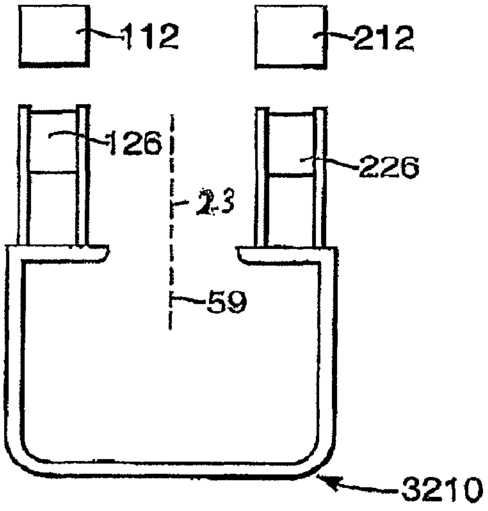
FIG. 37 shows a handle for two openings.

The body part 3230 with the spring bundle 53 can also be divided as is shown in FIG. 37 so that it is possible to arrange a shaft 61 or other arrangements between the two body areas 126, 226, indicated by a dashed line 59 in FIG. 34C, which each form the actual groove 51 in which a bundle of flat springs 29 can be inserted (not shown). Instead of an elongate opening 12 for receiving the two body areas 126, 226 of the handle 3210, two substantially narrower mounting openings 112, 212 could also be provided which are just sufficient to accommodate the body areas 126, 226.

The body part can form a substantially equilateral rectangle, and the distance between the support surface of the flange-like head part and the support surface of the end of the spring bundle can be enlarged in such a way that two thin walls can be connected together.

The holding forces can be adapted as needed exactly to existing requirements by means of this bundling by allocating only a certain quantity of flat springs to the bundle or bundles.

The range of thickness of the sheet metal at which the handle is to be mounted can also be adapted. To this end, flat springs whose thickness is only 0.5 mm to 0.6 mm are simply bundled for different clamping areas thereby multiplying the sheet-metal thickness tolerance or sheet-metal thickness range.

Figure 38:
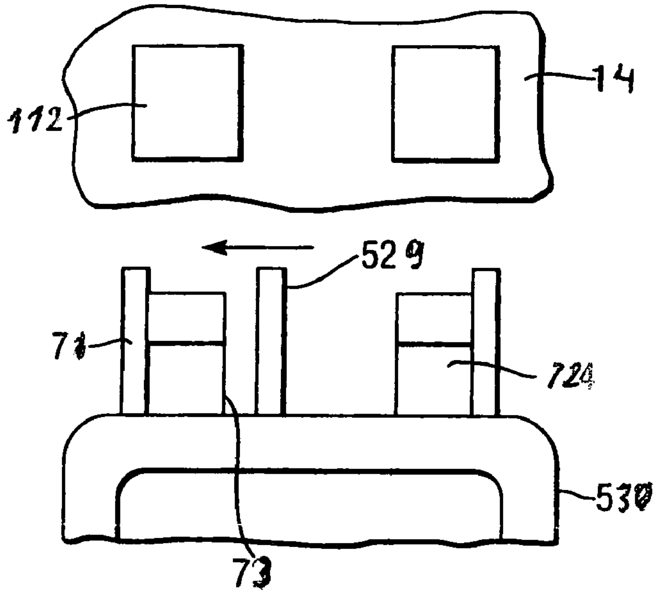
FIG. 38 shows an alternative embodiment form which works with a spring element that can be slid in from the side.
Figure 39:
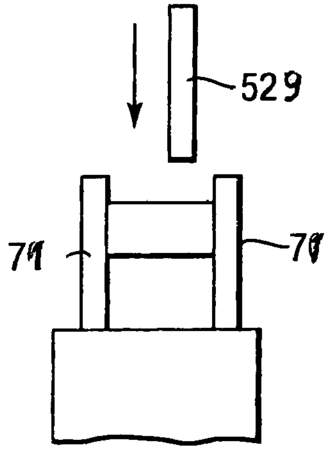
FIG. 39 shows an embodiment form which works with a spring element that can be inserted from above.
Figure 40:
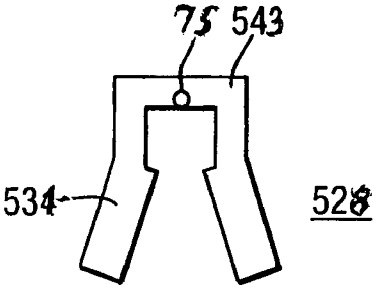
Figure 41A:
FIGS. 41A and 41B show another embodiment form of a flat spring.
Figure 41B:
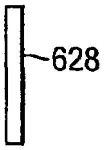
Figure 42A:
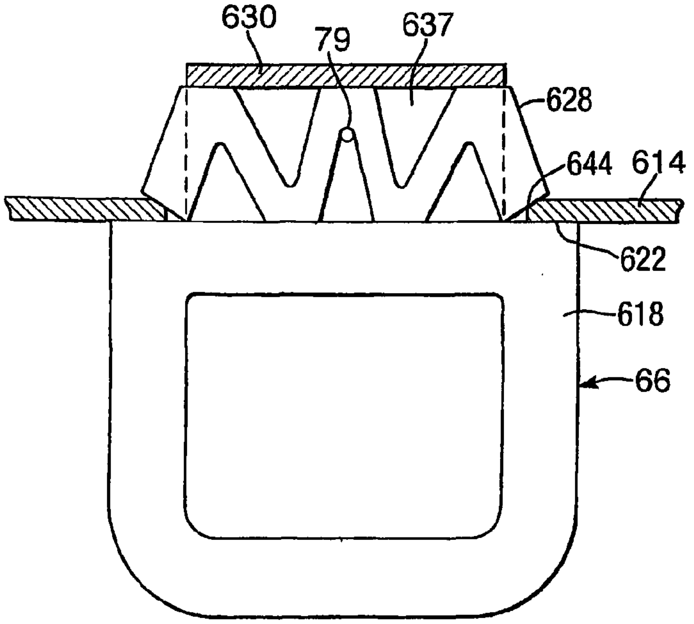
FIGS. 42A and 42B shows the application in a handle.
Figure 42B:
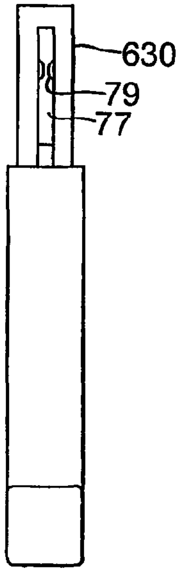

Another advantage consists in that the body part 530 on which the flat spring 529 (FIG. 40) can be inserted (from above with reference to FIG. 39) or slipped on (from the sides with reference to FIG. 38) can be produced in a simple manner. The body part 530 which is provided for insertion opens either on both sides into a flange 71, which prevents lateral slippage of the spring(s) 529 on both sides (see FIG. 39), or on at least one side, preferably the outer side (see FIG. 38), in which slippage is prevented on the slip-on side 73, where there is no flange 71, by other suitable steps such as a limited dimensioning of the associated opening 112, gluing or welding at least the final spring element of a bundle to the body part, or broadening a portion 75 of the spring 29 by pressing in the area of or in the vicinity of the web 43 in order to clamp the spring with the body part.

The body part is also easy to produce by injection molding inasmuch as injection dies without slides can be used and one split mold is sufficient.

While the U-web in the embodiment forms according to FIGS. 34A to 40 forms a substantially straight line, an embodiment form in which the (straight) web is shortened until the U-shape becomes a V-shape, not shown, can also be realized.

On the other hand, the U-web can also be M-shaped, or the V-shape can be expanded to form an M-shape (inverted W-shape) as is shown in FIGS. 41A to 42B by placing legs on both sides.

The V-shape or M-shape can be fixed by a body part 630 with a channel 77 in which the flat spring or the bundle of flat springs can be inserted. The lateral fixing can be carried out by projections 79 extending into the channel, or pin arrangements traversing the channel can be implemented. The legs with the supporting surfaces then proceed from the ends of the V or M.

COMMERCIAL APPLICABILITY

The invention is commercially applicable in switch cabinet construction.

While the foregoing description and drawings represent the present invention, it will be obvious to those skilled in the art that various changes may be made therein without departing from the true spirit and scope of the present invention.

REFERENCE NUMBERS

10, 610, 2210, 2510, 3210 handle
12, 112, 212, 2012, 2212, 2312 rectangular, round opening
14, 514, 614, 714, 1014, 1614, 2314 thin wall, door leaf
16 holding plate (connected to the door)
18 housing
19 flange
20 pin
22 webs
23 handle axis
24 rim of the opening
125, 225 body area
26 front, outer side of the thin wall 14
27 end
28, 428, 1228, 1328, 1528, 1628, 1728, 1828, 3228 head part
29, 529 U-shaped spring, flat spring
30, 530, 630, 830, 1130, 1530, 1630, 1730, 1830, 3230 body part
31 end of leg

32 rear, inner side of the thin wall 14
34, 1234, 1634 holding part
35, 1536 U-leg, leaf spring
36, 36-1, 36-2, 236, 436, 536, 636, 736, 836, 1136, 1436, 1736, 1836, 1936, 2036, 2136, 2236, 2326, 2436, 2536, 2636, 2736, 2836, 2936, 3036, 3136 holding element
37 cavity
38 inclined surface
39 projections
40 edge
41 recess
42, 242, 542, 742, 842 spring arrangements
43 U-web
44 lever
45 cut off end
46, 446 pin, axial pin
47 groove
48 stop arrangements
49 groove
50 rectangular cylinder
51 groove base
52 slide
53 wide spring bundle
54 locking hook arrangement
55 bundle
56 wedge
57 supporting surface
58 axis
59 line
60 edge of the opening
61 shaft
62 bevel
64 clamping surface
66 fixing plug
368 spring space
70 offset
71 flange
72 offset
73 slip-on side
74 support
75 spring portion
76 projection
77 channel
78 groove
79 projection, pin
80 bar lock
82 tool, key, lever
84 opening, pinion
86 projections, teeth
88, 2388 recess for holding element
90 recess for spring
92, 1192 knobs
94 reinforcement plate
96 reinforcement plate
98, 1398 spot weld
100 cavity
101 spring
102 slot, recess
104 recess, projection
106 threaded bore hole
18107 screw
108, 17108 head screw
111 cover
113 recess
115 stop surface
117 stop surface
119 opening
123 groove
125 ring seal
126, 226 body area
127 inclined surface
129 channel wall
131 fixing plug
133 unlocking key
135 opening
137 channel cover
139 offset area
141 wing
143 surface
145 bore holes
147 screw with conical base
149 screw with conical head
151 pin

The invention claimed is:

1. A handle comprising:

at least one holding plate which can be mounted around an opening in a thin wall;

a head part, which overlaps a rim of the opening on one side of the thin wall;

a body part which proceeds from the holding plate and can be pushed through the opening in the thin wall;

a holding part which is carried by the body part, supported on the other side of the thin wall, and being an individual part;

said holding part being formed by holding elements which project in a flexible manner from the body part to the outside of the body part and have a free end having an inclined surface for supporting the body part on an edge of the opening without play;

the holding elements including a substantially U-shaped spring;

the head part having a flange that covers the rim of the opening after mounting;

said body part proceeding from the holding plate and extending through the opening after mounting and holding at an end of the body part the substantially U-shaped spring which is supported on the inner edge of the opening by the ends of legs of the U-shaped spring; and said U-shaped spring being a planar structural component part and having U-legs which are cut off at the end substantially at right angles to their extension such that when mounted they are supported on the edge with a slight inclination relative to the plane of the thin wall.

2. The handle according to claim 1, wherein the bottom bar of the U-shaped spring a substantially straight line.

3. The handle according to claim 2, wherein the U-shaped spring has resiliently flexible projections which project from the U-legs into an opening enclosed by the legs and which can be received in a positive engagement by corresponding recesses in the body part when mounted.

4. The handle according to claim 3, wherein the U-shaped spring includes a first portion and a second portion, wherein the first portion includes two legs proceeding from the bottom bar of the U-shaped spring and extending parallel to one another with a first distance in between and wherein the second portion includes two projections, which extend with a second and increasing distance in between greater than the first distance and are cut off at the end substantially at right angles to their extension such that when mounted they are supported on the edge of the opening with a slight inclination relative to the plane of the thin wall.

5. The handle according to claim 4, wherein the body part has oppositely located grooves which form a recess through alteration of the depth of the groove base and which have a depth such that they are capable of receiving the U-legs of at least one spring at least during the mounting process.

6. The handle according to claim 5, wherein the grooves have a width such that a bundle of a plurality of the U-shaped springs arranged next to one another can be accommodated.

7. The handle according to claim 2, wherein the spring is held within a channel that is held by the body part.

8. The handle according to claim 7, wherein the U-shaped spring is held in the body part by a projection of the body part.

9. The handle according to claim 1, wherein the outer cross section of the body part and of the associated opening in the thin wall are rectangular.

10. The handle according to claim 1, wherein the body part is an elongated rectangle and forms a head with a finger grip or hand grip.

11. The handle according to claim 1, wherein the body part forms an elongated or substantially equilateral rectangle, and a distance between a support surface of the head part and a support surface of the spring is increased to connect two thin walls together.

12. The handle according to claim 1, wherein the body part forms an elongated or substantially equilateral rectangle, and the associated head part is a point of support for one end of a handle.

13. The handle according to claim 1, wherein the spring has a thickness of 0.5 mm to 0.8 mm.

14. A handle comprising:

at least one holding plate which can be mounted around an opening in a thin wall;

a head part which overlaps a rim of the opening on one side of the thin wall;

a body part which proceeds from the holding plate and can be pushed through the opening in the thin wall;

a holding part which is carried by the body part, supported on the other side of the thin wall, and being an individual part;

said holding part being formed by holding elements which project in a flexible manner from the body part to the outside of the body part and have a free end having an inclined surface for supporting the body part on an edge of the opening without play;

the holding elements including a substantially V-shaped spring;

the head part having a flange that covers the rim of the opening after mounting;

said body part proceeding from the holding plate and extending through the opening after mounting and holding at an end of the body part the substantially V-shaped spring which is supported on the inner edge of the opening by the ends of legs of the V-shaped spring; and said V-shaped spring being a planar structural component part and having legs which are cut off at the end substantially at right angles to their extension such that when mounted they are supported on the edge with a slight inclination relative to the plane of the thin wall.

15. A handle comprising:

at least one holding plate which can be mounted around an opening in a thin wall;

a head part which overlaps a rim of the opening on one side of the thin wall;

a body part which proceeds from the holding plate and can be pushed through the opening in the thin wall;

a holding part which is carried by the body part, supported on the other side of the thin wall, and being an individual part;

said holding part being formed by holding elements which project in a flexible manner from the body part to the outside of the body part and have a free end having an inclined surface for supporting the body part on an edge of the opening without play;

the holding elements including a substantially M-shaped or W-shaped spring;

the head part having a flange that covers the rim of the opening after mounting;

said body part proceeding from the holding plate and extending through the opening after mounting and holding at an end of the body part the substantially M-shaped or W-shaped spring which is supported on the inner edge of the opening by the ends of legs of the M-shaped or W-shaped spring; and said M-shaped or W-shaped spring being a planar structural component part and having legs which are cut off at the end substantially at right angles to their extension such that when mounted they are supported on the edge with a slight inclination relative to the plane of the thin wall.

* * * * *